United States Patent
Hayashi et al.

(10) Patent No.: US 11,977,306 B2
(45) Date of Patent: May 7, 2024

(54) TRANSPARENT SCREEN

(71) Applicant: FUJIFILM Corporation, Tokyo (JP)

(72) Inventors: Takahiro Hayashi, Kanagawa (JP);
Mitsuyoshi Ichihashi, Kanagawa (JP);
Satoshi Kuniyasu, Kanagawa (JP);
Hirofumi Toyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 16 days.

(21) Appl. No.: 17/847,390

(22) Filed: Jun. 23, 2022

(65) Prior Publication Data

US 2022/0326562 A1 Oct. 13, 2022

Related U.S. Application Data

(63) Continuation of application No. PCT/JP2020/047577, filed on Dec. 18, 2020.

(30) Foreign Application Priority Data

Dec. 26, 2019 (JP) .................. 2019-237298

(51) Int. Cl.
*G02F 1/137* (2006.01)
*G03B 21/62* (2014.01)

(52) U.S. Cl.
CPC ......... *G02F 1/13718* (2013.01); *G03B 21/62* (2013.01)

(58) Field of Classification Search
None
See application file for complete search history.

(56) References Cited

U.S. PATENT DOCUMENTS

| | | | |
|---|---|---|---|
| 5,999,281 A | 12/1999 | Abbott et al. | |
| 2004/0252373 A1 | 12/2004 | Umeya | |
| 2008/0030882 A1 | 2/2008 | Ichikawa et al. | |
| 2011/0027474 A1 | 2/2011 | Ichikawa et al. | |
| 2017/0343830 A1 | 11/2017 | Nagai et al. | |
| 2018/0162113 A1* | 6/2018 | Kono | B32B 27/32 |
| 2019/0391479 A1 | 12/2019 | Katoh et al. | |
| 2020/0183214 A1* | 6/2020 | Katoh | C09K 19/56 |
| 2020/0271839 A1 | 8/2020 | Saitoh et al. | |
| 2020/0409202 A1 | 12/2020 | Kodama et al. | |

(Continued)

FOREIGN PATENT DOCUMENTS

| | | |
|---|---|---|
| CN | 1573526 A | 2/2005 |
| CN | 107250910 A | 10/2017 |

(Continued)

OTHER PUBLICATIONS

Notice of Reasons for Refusal for Japanese Patent Application No. 2021-567419, dated Feb. 28, 2023, with English translation.

(Continued)

*Primary Examiner* — Ryan Crockett
(74) *Attorney, Agent, or Firm* — Birch, Stewart, Kolasch & Birch, LLP

(57) ABSTRACT

The present disclosure provides a transparent screen including two main surfaces, and out of light of which a wavelength incident on one main surface out of the two main surfaces is 532 nm, a half width of a peak observed in a distribution indicating strength with respect to a diffraction angle of a primary diffraction light emitted from the other main surface out of the two main surfaces is 2 degrees or greater.

12 Claims, 2 Drawing Sheets

(56) References Cited

U.S. PATENT DOCUMENTS

2021/0223448 A1* 7/2021 Sato .................... G02B 27/0172
2022/0333013 A1* 10/2022 Hayashi ................. C09K 19/36
2022/0372372 A1* 11/2022 Hayashi ............... C09K 19/586
2022/0373726 A1* 11/2022 Hayashi ............... G02B 5/1833

FOREIGN PATENT DOCUMENTS

| | | |
|---|---|---|
| JP | 2005-84171 A | 3/2005 |
| JP | 2006-243693 A | 9/2006 |
| JP | 2018-180122 A | 11/2018 |
| WO | WO 2017/030176 A1 | 2/2017 |
| WO | WO 2018/159751 A1 | 9/2018 |
| WO | WO 2018/199092 A1 | 11/2018 |
| WO | WO 2019/035449 A1 | 2/2019 |
| WO | WO 2019/093228 A1 | 5/2019 |
| WO | WO 2019/182052 A1 | 9/2019 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/047577, dated Jul. 7, 2022.
International Search Report (Form PCT/ISA/210) for International Application No. PCT/JP2020/047577, dated Mar. 2, 2021, with English translation.
Chinese Office Action and Search Report for corresponding Chinese Application No. 202080089265.7, dated Sep. 9, 2023, with a partial English translation.

\* cited by examiner

TRANSPARENT SCREEN

CROSS-REFERENCE TO RELATED APPLICATIONS

This application is a continuation application of International Application No. PCT/JP2020/047577, filed Dec. 18, 2020, the disclosure of which is incorporated herein by reference in its entirety. Further, this application claims priority from Japanese Patent Application No. 2019-237298, filed Dec. 26, 2019, the disclosure of which is incorporated herein by reference in its entirety.

BACKGROUND OF THE INVENTION

1. Field of the Invention

The present disclosure relates to a transparent screen.

2. Description of the Related Art

As an article (hereinafter, referred to as "screen") displaying light projected from a projector (for example, a moving picture projector) as images (including still images and moving images, the same hereinafter), for example, a reflective screen and a transmissive screen are known. In a reflective screen, an image is displayed by using light reflected on a surface or the inside of the screen. In a transmissive screen, an image is displayed by using light transmitted through the screen. The screen can also be used as a head-up display for automobiles and as an intermediate screen.

On the other hand, due to the property of the screen for displaying an image, it is difficult for an observer positioned in front of the screen to observe the scenery behind the screen (that is, the background). Therefore, a transflective reflective screen that allows the background of the screen to be observed from the front has been proposed (for example, refer to JP2006-243693A).

SUMMARY OF THE INVENTION

However, in the screen in the related art (for example, the screen disclosed in JP2006-243693A), there is a problem that a hue of a visually recognized image differs depending on a location (for example, observation angle) of an observer with respect to the screen, for example. If the hue of the image differs depending on the observation position, that is, if the color reproducibility of the image is low, the hue of the visually recognized image will be significantly different from the original hue of the image.

The present disclosure has been made in view of the circumstances.

One aspect of the present disclosure is to provide a transparent screen having excellent color reproducibility of an image.

The present disclosure includes the following aspects.

<1> A transparent screen including two main surfaces, in which out of light of which a wavelength incident on one main surface out of the two main surfaces is 532 nm, a half width of a peak observed in a distribution indicating strength with respect to a diffraction angle of a primary diffraction light emitted from the other main surface out of the two main surfaces is 2 degrees or greater.

<2> The transparent screen as described in <1> including at least one cholesteric liquid crystal layer including a liquid crystal compound, in which in a cross-sectional view of the cholesteric liquid crystal layer in a thickness direction, a spiral axis derived from the liquid crystal compound of the cholesteric liquid crystal layer is inclined with respect to a straight line orthogonal to at least one main surface out of the two main surfaces positioned on opposite sides of the cholesteric liquid crystal layer.

<3> The transparent screen as described in <2>, in which the liquid crystal compound observed on at least one main surface out of the two main surfaces positioned on the opposite sides of the cholesteric liquid crystal layer is arranged while being twisted along one direction of an in-plane direction of the cholesteric liquid crystal layer.

<4> The transparent screen as described in <2> or <3>, in which in the cross-sectional view of the cholesteric liquid crystal layer in the thickness direction, an average angle of the spiral axis is 20 degrees to 90 degrees with respect to the straight line orthogonal to the at least one main surface out of the two main surfaces positioned on the opposite sides of the cholesteric liquid crystal layer.

<5> The transparent screen as described in any one of <2> to <4>, in which in the cross-sectional view of the cholesteric liquid crystal layer in the thickness direction, an average length of one period of the spiral axis is 0.1 μm to 5 μm.

<6> The transparent screen as described in any one of <2> to <5>, in which the number of the cholesteric liquid crystal layers is two or more, and directions of the spiral axes derived from the liquid crystal compounds of at least two cholesteric liquid crystal layers are different from each other.

<7> A transparent screen including at least one cholesteric liquid crystal layer containing a liquid crystal compound, in which in a cross-sectional view of the cholesteric liquid crystal layer in a thickness direction, a spiral axis derived from the liquid crystal compound of the cholesteric liquid crystal layer is inclined with respect to a straight line orthogonal to at least one main surface out of two main surfaces positioned on the opposite sides of the cholesteric liquid crystal layer, in the cross-sectional view of the cholesteric liquid crystal layer in the thickness direction, the cholesteric liquid crystal layer has a stripe pattern in which a bright portion and a dark portion are alternatively arranged, and in the cross-sectional view of the cholesteric liquid crystal layer in the thickness direction, a periodic distribution of the bright portion and the dark portion is 0.05 μm or greater.

<8> A transparent screen including a first cholesteric liquid crystal layer containing a liquid crystal compound and a second cholesteric liquid crystal layer containing a liquid crystal compound, in which in a cross-sectional view of the first cholesteric liquid crystal layer in a thickness direction, a spiral axis derived from the liquid crystal compound of the first cholesteric liquid crystal layer is inclined with respect to a straight line orthogonal to at least one main surface out of two main surfaces positioned on the opposite sides of the first cholesteric liquid crystal layer, in a cross-sectional view of the first cholesteric liquid crystal layer in a thickness direction, the first cholesteric liquid crystal layer has a stripe pattern in which a bright portion and a dark portion are alternatively arranged, in a cross-sectional view of the second cholesteric liquid crystal layer in a thickness direction, a spiral axis derived from the liquid crystal compound of the second cholesteric liquid crystal layer is inclined with respect to a straight line orthogonal to at least one main surface out of two main surfaces positioned on the opposite sides of the second cholesteric liquid crystal layer, in the cross-sectional view of the second cholesteric liquid crystal layer in the thickness direction, the second cholesteric liquid crystal layer has a stripe pattern in which a bright portion and a dark portion are alternatively arranged, and in the cross-sectional view of the first cholesteric liquid crystal layer and the second cholesteric liquid crystal layer in the thickness direction, an absolute value of a difference between an average period length of the bright portion and the dark portion in the first cholesteric liquid crystal layer and an average period length of the bright portion and the dark portion in the second cholesteric liquid crystal layer is 0.05 μm or greater.

<9> A transparent screen including at least one cholesteric liquid crystal layer containing a liquid crystal compound, in which in a cross-sectional view of the cholesteric liquid crystal layer in a thickness direction, a spiral axis derived from the liquid crystal compound of the cholesteric liquid crystal layer is inclined with respect to a straight line orthogonal to at least one main surface out of two main surfaces positioned on the opposite sides of the cholesteric liquid crystal layer, in the cross-sectional view of the cholesteric liquid crystal layer in the thickness direction, the cholesteric liquid crystal layer has a stripe pattern in which a bright portion and a dark portion are alternatively arranged, and in the cross-sectional view of the cholesteric liquid crystal layer in the thickness direction, an angle distribution of the bright portion is 3 degrees or greater.

<10> A transparent screen including a first cholesteric liquid crystal layer containing a liquid crystal compound and a second cholesteric liquid crystal layer containing a liquid crystal compound, in which in a cross-sectional view of the first cholesteric liquid crystal layer in a thickness direction, a spiral axis derived from the liquid crystal compound of the first cholesteric liquid crystal layer is inclined with respect to a straight line orthogonal to at least one main surface out of two main surfaces positioned on the opposite sides of the first cholesteric liquid crystal layer, in a cross-sectional view of the first cholesteric liquid crystal layer in a thickness direction, the first cholesteric liquid crystal layer has a stripe pattern in which a bright portion and a dark portion are alternatively arranged, in a cross-sectional view of the second cholesteric liquid crystal layer in a thickness direction, a spiral axis derived from the liquid crystal compound of the second cholesteric liquid crystal layer is inclined with respect to a straight line orthogonal to at least one main surface out of two main surfaces positioned on the opposite sides of the second cholesteric liquid crystal layer, in the cross-sectional view of the second cholesteric liquid crystal layer in the thickness direction, the second cholesteric liquid crystal layer has a stripe pattern in which a bright portion and a dark portion are alternatively arranged, and in the cross-sectional view of the first cholesteric liquid crystal layer and the second cholesteric liquid crystal layer in the thickness direction, an absolute value of a difference between an average angle of the bright portion in the first cholesteric liquid crystal layer and an average angle of the bright portion in the second cholesteric liquid crystal layer is 3 degrees or greater.

<11> The transparent screen as described in any one of <1> to <10>, which is used as a rear projection screen.

<12> The transparent screen as described in any one of <1> to <10>, which is used by being attached to an automobile window.

According to one aspect of the present disclosure, there is provided a transparent screen having excellent color reproducibility of an image.

DESCRIPTION OF THE PREFERRED EMBODIMENTS

Figure 1:
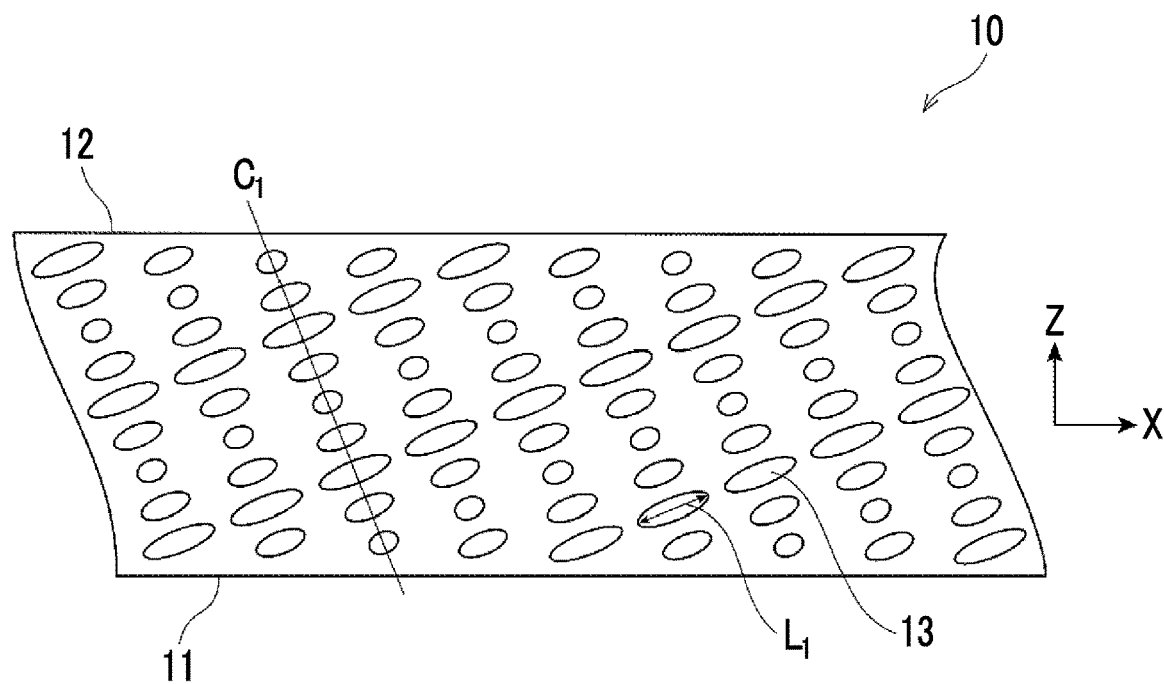
FIG. 1 is a schematic cross-sectional view showing an example of a cholesteric liquid crystal layer according to a first embodiment of the present disclosure.

Hereinafter, embodiments of the present disclosure will be described in detail. The present disclosure is not limited to the following embodiments, and may be carried out with appropriate modifications within the scope of the purpose of the present disclosure.

In a case where the embodiments of the present disclosure are described with reference to the drawings, the description of overlapping constituent elements and reference numerals in the drawings may be omitted. The constituent elements shown by using the same reference numerals in the drawings mean that the constituent elements are the same constituent elements. A dimensional ratio in the drawings does not necessarily represent the actual dimensional ratio.

In the present disclosure, the numerical range indicated by using "to" indicates a range including the numerical values before and after "to" as the lower limit value and the upper limit value, respectively. In the numerical value range described stepwise in the present disclosure, the upper limit value or the lower limit value described in a certain numerical range may be replaced with the upper limit value or the lower limit value of the numerical value range described in another stepwise description. In addition, in the numerical value range described in the present disclosure, the upper limit value or the lower limit value described in a certain numerical value range may be replaced with the value shown in examples.

In the present disclosure, an amount of each component in the composition means a total amount of a plurality of substances present in the composition, unless otherwise specified, in a case where the plurality of substances corresponding to each component are present in the composition.

In the present disclosure, the term "step" includes not only an independent step but also those as long as a desired purpose is achieved even in a case where the term cannot be clearly distinguished from other steps, as the present term.

In the present disclosure, "% by mass" and "% by weight" are synonymous, and "parts by mass" and "parts by weight" are synonymous.

In the present disclosure, a combination of two or more preferable forms is a more preferable aspect.

In the present disclosure, "transparent" means that the total light transmittance is 50% or greater. The total light transmittance is measured using a known spectrophotometer (for example, haze meter NDH 2000, Nippon Denshoku Industries Co., Ltd.).

In the present disclosure, the term "main surface" means a surface of an object having a major area.

In the present disclosure, the "molecular axis" means an axis that passes through a center of a molecular structure along a longitudinal direction of the molecular structure. However, the "molecular axis" used in relation to a disk-like liquid crystal compound means an axis that intersects a disc plane of the disk-like liquid crystal compound at a right angle.

In the present disclosure, "solid content" means a component obtained by removing a solvent from all the components of an object.

In the present disclosure, the "mass of solid content" means a mass obtained by removing a mass of the solvent from the mass of the object.

In the present disclosure, the ordinal numbers (for example, "first" and "second") are terms used to distinguish the constituent elements and do not limit the number of the constituent elements and the superiority or inferiority of the constituent elements.

<Transparent Screen According to First Embodiment>

A transparent screen according to a first embodiment of the present disclosure includes two main surfaces, and out of light of which a wavelength incident on one main surface out of the two main surfaces is 532 nm, a half width of a peak observed in a distribution indicating strength with respect to a diffraction angle of a primary diffraction light emitted from the other main surface out of the two main surfaces is 2 degrees or greater. The transparent screen according to the first embodiment of the present disclosure has the configuration and is excellent in color reproducibility of an image.

The reason why the transparent screen according to the first embodiment of the present disclosure exhibits the effect is presumed as follows. One of the factors of the color reproducibility of an image deteriorating is considered to be optical properties of the screen. For example, it is known that the diffraction angle of light usually changes depending on a wavelength of light. In the present disclosure, by paying attention to the diffraction of light, the color reproducibility of the image is improved as compared with the screen in the related art. That is, in the transparent screen according to the first embodiment of the present disclosure, out of light of which a wavelength incident on one main surface out of the two main surfaces is 532 nm, a half width of a peak observed in a distribution indicating strength with respect to a diffraction angle of a primary diffraction light emitted from the other main surface out of the two main surfaces, out of light of which a wavelength incident on one main surface out of the two main surfaces is 532 nm, is 2 degrees or greater, and thus it is possible to suppress discreteness of a diffraction angle of light (in particular, visible light). That is, the transparent screen according to the first embodiment of the present disclosure, it is possible to suppress a wavelength dependence of the strength of light (in particular, visible light) that reaches an observer from the transparent screen from significantly changing depending on an observation position (in particular, observation angle), and thus it is possible to provide the observer with an image which does not affect the observation position and reproduces an original hue. Therefore, the transparent screen according to the first embodiment of the present disclosure is excellent in color reproducibility of an image.

[Main Surface]

The transparent screen according to the first embodiment of the present disclosure has two main surfaces. The two main surfaces correspond to an incident surface of light and an emitting surface of light, respectively, in the measurement of the strength distribution of primary diffraction light described later. As long as the requirements are met, aspects of the two main surfaces are not limited. In the present disclosure, an aspect that "the transparent screen has two main surfaces" does not limit the inclusion of three or more surfaces in the transparent screen.

From a viewpoint of practicality and color reproducibility of an image, the two main surfaces are preferably positioned on the opposite sides of each other, and are more preferably positioned on the opposite sides of each other in a thickness direction (meaning the thickness direction of the transparent screen. Hereinafter, the same in the present paragraph). The two main surfaces positioned on the opposite sides of each other correspond to a front side surface (that is, front surface) of the transparent screen and a rear side surface (that is, rear surface) of the transparent screen, respectively. The two main surfaces positioned on the opposite sides of each other in the thickness direction intersect (preferably orthogonally) each other in the thickness direction.

From the viewpoint of practicality and color reproducibility of the image, the two main surfaces are preferably disposed parallel to each other. In the present disclosure, the aspect that "two main surfaces are disposed parallel to each other" is not limited to a state where a positional relationship between the two main surfaces is strictly parallel, and includes a state where one main surface out of the two main surfaces is inclined to the other main surface out of the two main surfaces within a range of ±10 degrees.

An area of the main surface is not limited. The area of the main surface may be determined, for example, according to the use, the installation location of the transparent screen, and the size of the image to be displayed. The total area of the two main surfaces may be determined, for example, in a range of 0.01 cm$^2$ to 1,000,000 cm$^2$.

A total area ratio of the two main surfaces is preferably 50% or more, more preferably 70% or more, and particularly preferably 90% or more with respect to the surface area of the transparent screen. A lower limit of the total area ratio of the two main surfaces may be 95% or 99% with respect to the surface area of the transparent screen. The total area ratio of the two main surfaces is preferably less than 100% with respect to the surface area of the transparent screen.

The areas of the two main surfaces may be the same or different. From a viewpoint of practicality, the areas of the two main surfaces are preferably the same. For example, in a case where the areas of the two main surfaces are the same, the two main surfaces correspond to the two surfaces that have the largest area, respectively, out of the surfaces of the transparent screen. For example, in a case where the areas of the two main surfaces are different, the two main surfaces correspond to a surface having the first largest area and a surface having the second largest area, respectively, out of the surfaces of the transparent screen. However, specification of the two main surfaces is performed in consideration of not only the area but also the measurement of the strength distribution of the primary diffraction light described later.

A shape of the main surface is not limited. The shape of the main surface may be determined, for example, according to the use and the installation location. Shapes of the main surface in a plan view include, for example, circles (for example, perfect circles and ellipses), polygons (for example, triangles, quadrangles, pentagons, and hexagons), and indefinite shapes. The shape of the main surface in a plan view is preferably a quadrangle from the viewpoint of productivity of the transparent screen and handleability of the transparent screen. Examples of the quadrangle include a square and a rectangle. The shapes of the two main surfaces may be the same or different. The shapes of the two main surfaces are preferably the same.

The main surface may be a planar or curved main surface.

[Optical Properties]

Hereinafter, the optical properties of the transparent screen according to the first embodiment of the present disclosure will be described.

In the transparent screen according to the first embodiment of the present disclosure, out of light of which a wavelength incident on one main surface out of the two main surfaces is 532 nm, a half width of a peak observed in a distribution (hereinafter, referred to as "specific strength distribution" in some cases) indicating strength with respect to a diffraction angle of a primary diffraction light emitted from the other main surface out of the two main surfaces is 2 degrees or greater. As the half width of the peak observed in the specific strength distribution is 2 degrees or greater, it is possible to suppress a wavelength dependence of the strength of light (in particular, visible light) that reaches an observer from the transparent screen from significantly changing depending on an observation position (in particular, observation angle), and thus it is possible to suppress deterioration of color reproducibility of the image.

The half width of the peak observed in the specific strength distribution is measured by the following method. The light source is disposed to oppose one main surface (hereinafter, referred to as "first main surface" in the present paragraph) of the two main surfaces of the transparent screen. A detector is disposed to oppose the other main surface (hereinafter, referred to as "second main surface" in the present paragraph) of the two main surfaces of the transparent screen. That is, a transparent screen is disposed between the light source and the detector. The light emitted from the light source (wavelength: 532 nm) is irradiated to one main surface (that is, first main surface) out of the two main surfaces of the transparent screen, and strength of the primary diffraction light emitted from the other main surface (that is, second main surface) out of the two main surfaces is measured while changing an angle (meaning an angle of the detector to an emitting surface of the primary diffraction light. The same hereinafter) of the detector. Based on the measurement results, the strength distribution of the primary diffraction light is created. In the strength distribution of the primary diffraction light, the diffraction angle of the primary diffraction light is shown on a lateral axis, and the strength of the primary diffraction light is shown on a vertical axis. The half width (meaning a half value full width) of the peak observed in the strength distribution of the primary diffraction light is obtained. In a case where a plurality of peaks are observed in the strength distribution of the primary diffraction light, the half width of the peak having a maximum strength is obtained. Specific measurement conditions are shown below.

(1) Light source: A light source capable of irradiating light having a wavelength of 532 nm (for example, 532 nm laser, LPG350, Nihon Jisyaku Kogyo Co., Ltd.)
(2) Detector: Known detector (for example, OPTICAL POWER SENSOR MA9411A, Anritsu Co., Ltd.)
(3) Optical measuring instrument: Known optical measuring instrument (for example, optical power meter, OPTICAL POWER METER ML9001A, Anritsu Co., Ltd.)
(4) Distance between transparent screen and light source: 10 cm
(5) Distance between transparent screen and detector: 10 cm
(6) Incident angle (angle formed by an incident direction of light and a straight line orthogonal to a main surface of a transparent screen): 0 degree
(7) Measurement interval (detector angle interval): 1 degree The half width of the peak observed in the specific strength distribution is preferably 4 degrees or greater, more preferably 6 degrees or greater, and particularly preferably 8 degrees or greater, from a viewpoint of color reproducibility of the image. The upper limit of the half width of the peak observed in the specific strength distribution is not limited from the viewpoint of color reproducibility of the image. The upper limit of the half width of the peak observed in the specific strength distribution may be, for example, 60 degrees, 40 degrees, or 20 degrees. The half width of the peak observed in the specific strength distribution is preferably 4 degrees to 60 degrees, more preferably 6 degrees to 60 degrees, and particularly preferably 8 degrees to 60 degrees.

The half width of the peak observed in the specific strength distribution can be controlled, for example, depending on the composition of the transparent screen and the structure of the transparent screen. For example, by using the cholesteric liquid crystal layer described later, the half width of the peak observed in the specific strength distribution can be easily controlled.

A total light transmittance of the transparent screen according to the first embodiment of the present disclosure is preferably 50% to 100%, more preferably 80% to 100%, and particularly preferably 90% to 100%. The total light transmittance is one of the indicators representing transparency. As the total light transmittance is in the range, since the transparency of the transparent screen is improved, the visibility of the background of the transparent screen is improved. The total light transmittance is measured using a known spectrophotometer (for example, haze meter NDH 2000, Nippon Denshoku Industries Co., Ltd.).

[Other Constituent Elements]

In the transparent screen according to the first embodiment of the present disclosure, the constituent elements other than the two main surfaces are not limited as long as the half width of the peak observed in the specific strength distribution is 2 degrees or greater. Hereinafter, preferable constituent elements other than the two main surfaces will be described.

(Cholesteric Liquid Crystal Layer)

The transparent screen according to the first embodiment of the present disclosure preferably has at least one cholesteric liquid crystal layer containing a liquid crystal compound. According to the cholesteric liquid crystal layer containing a liquid crystal compound, the half width of the peak observed in the specific strength distribution can be easily controlled.

—Molecular Arrangement—

The cholesteric liquid crystal layer is a layer containing a cholesteric liquid crystal. A cholesteric liquid crystal known as a form of liquid crystal has a spiral structure formed by spirally arranging a plurality of liquid crystal compounds. Specifically, in a cholesteric liquid crystal, the molecular arrangement of the liquid crystal compound is aligned in a certain direction in any one plane, and twisting is formed in the adjacent planes. A spiral structure is formed by generating twist between two adjacent liquid crystal compounds. In the spiral structure, the molecular axis of the liquid crystal compound is substantially orthogonal to the spiral axis (hereinafter, may be simply referred to as "spiral axis") derived from the liquid crystal compound.

In a case of observing the cholesteric liquid crystal layer (for example, a cross-section of the cholesteric liquid crystal layer in the thickness direction) using a scanning electron microscope or a polarizing microscope, a stripe pattern including a bright portion (meaning a region looks relatively bright. The same hereinafter) and a dark portion (meaning a region that looks relatively dark. The same hereinafter) is observed. The stripe pattern is observed as, for example, a stripe pattern in which the bright portion and the dark portion are alternately arranged. The reason why the stripe pattern is observed is that the direction of the molecular axis of the liquid crystal compound forming the spiral structure changes with respect to the observation direction. For example, a region in which the direction of the molecular axis of the rod-like liquid crystal compound is parallel to the observation direction (including a position close to parallel) looks relatively dark. On the other hand, a region in which the direction of the molecular axis of the rod-like liquid crystal compound is orthogonal to the observation direction (including a position close to orthogonal) looks relatively bright. By alternatively arranging the two regions, the stripe pattern in which the bright portion and the dark portion are alternately arranged is observed.

In the cross-sectional view of the cholesteric liquid crystal layer in the thickness direction, the spiral axis derived from the liquid crystal compound of the cholesteric liquid crystal layer is preferably inclined with respect to a straight line orthogonal to at least one main surface out of the two main surfaces positioned on the opposite sides of the cholesteric liquid crystal layer. Since the spiral axis is inclined as described above, a pattern in which the refractive index changes periodically is formed on the main surface, and the emitted light is diffracted. In the present disclosure, in a case where the term "straight line orthogonal to the main surface" is used in relation to a curved main surface, the "straight line orthogonal to the main surface" means a normal line of the curved main surface. In the present disclosure, an aspect that "the spiral axis is inclined with respect to a straight line orthogonal to the main surface" is not limited to a state in which the spiral axis is inclined with respect to a straight line orthogonal to the main surface of the cholesteric liquid crystal layer, and includes a state in which the spiral axis is orthogonal to the straight line orthogonal to the main surface of the cholesteric liquid crystal layer (that is, an angle formed between the spiral axis and the straight line orthogonal to the main surface of the cholesteric liquid crystal layer is 90 degrees).

In the present disclosure, the cross-sectional view of the cholesteric liquid crystal layer in the thickness direction is observed using a scanning electron microscope or a polarizing microscope. A sample used for cross-section observation may be prepared by using a microtome, for example.

Inclination of the spiral axis (meaning that the spiral axis is inclined with respect to a straight line orthogonal to the main surface. The same hereinafter) may be observed in at least one cross-sectional view of the cholesteric liquid crystal layer in the thickness direction. For example, even in a case where the inclination of the spiral axis is not observed in any one cross-sectional view, the inclination of the spiral axis may be observed in the other cross-sectional view. This is because there is a possibility that the direction of the observed spiral axis may change depending on the observation direction. In the cross-sectional view of the cholesteric liquid crystal layer in the thickness direction, in a case where a stripe pattern in which a bright portion and a dark portion are alternately arranged is observed, the applicability of the inclination of the spiral axis may be confirmed based on the stripe pattern. This is because the spiral axis is substantially orthogonal to the arrangement direction of the bright portion and the dark portion in the stripe pattern in which the bright portion and the dark portion are alternatively arranged.

In the cross-sectional view of the cholesteric liquid crystal layer in the thickness direction, an average angle of the spiral axis is preferably 20 degrees to 90 degrees, more preferably 30 degrees to 90 degrees, and particularly preferably 40 degrees to 90 degrees with respect to a straight line orthogonal to at least one main surface out of the two main surfaces positioned on opposite sides of the cholesteric liquid crystal layer.

The average angle of the spiral axis is obtained by the following method. Each of angles formed between the five spiral axes and the straight line orthogonal to the main surface of the cholesteric liquid crystal layer is measured based on a cross-sectional image of the cholesteric liquid crystal layer obtained by using a scanning electron microscope or a polarizing microscope. A value obtained by arithmetically averaging the measured values is taken as the average angle of the spiral axis.

The liquid crystal compound observed on at least one main surface out of the two main surfaces positioned on the opposite sides of the cholesteric liquid crystal layer is preferably arranged while being twisted along one direction of the in-plane directions of the cholesteric liquid crystal layer. It is more preferable that the liquid crystal compounds observed on the two main surfaces positioned on the opposite sides of the cholesteric liquid crystal layer are arranged while being twisted along one direction of the in-plane directions of the cholesteric liquid crystal layer. By arranging the liquid crystal compounds as described above, the effect of diffracting the light emitted from the main surface can be obtained.

In the present disclosure, "the liquid crystal compounds are arranged while being twisted along one direction of the in-plane directions of the cholesteric liquid crystal layer" means that in a case of observing (that is, in a plan view) the main surface (limited to a main surface to be an observation object) of the cholesteric liquid crystal layer using a scanning electron microscope or a polarizing microscope, a stripe pattern in which a bright portion and a dark portion are alternatively arranged is observed along one direction of the in-plane directions of the cholesteric liquid crystal layer.

Hereinafter, the observation results will be described. As the liquid crystal compounds are arranged while being twisted along one direction of the in-plane directions of the cholesteric liquid crystal layer, the direction of the molecular axis of the liquid crystal compound changes as the liquid crystal compound proceeds in the one direction. The change in the direction of the molecular axis of the liquid crystal compound is due to the fact that two liquid crystal compounds adjacent to each other in the one direction are in a twisted position. As the direction of the molecular axis of the liquid crystal compound changes as the liquid crystal compound proceeds in the one direction, a stripe pattern in which a bright portion and a dark portion are alternately arranged is observed depending on the direction of the molecular axis of the liquid crystal compound with respect to the observation direction.

In the cross-sectional view of the cholesteric liquid crystal layer in the thickness direction, an average length of one period of the spiral axis (that is, the length of the spiral axis per one rotation of the spiral) is preferably 0.1 µm or greater, more preferably 0.5 µm or greater, and particularly preferably 1 µm or greater. This is because a diffraction angle of light (in particular, visible light) becomes large in a case where the average length of one period of the spiral axis is small, and the visibility of the image on the front surface of the screen (front surface of the main surface) deteriorates. From the viewpoint of color reproducibility of the image, the average length of one period of the spiral axis is preferably 500 µm or less, more preferably 200 µm or less, and particularly preferably 100 µm or less. This is because the diffraction effect becomes small in a case where the average length of one period of the spiral axis is large. On the other hand, from a viewpoint of forming the spiral structure of the cholesteric liquid crystal layer, the average length of one period of the spiral axis is preferably 5 µm or less, more preferably 3 µm or less, and particularly preferably 2 µm or less. The average length of one period of the spiral axis is preferably 0.1 µm to 500 µm, more preferably 0.5 µm to 200 µm, and particularly preferably 1 µm to 100 µm. In addition, the average length of one period of the spiral axis is preferably 0.1 µm to 5 µm, more preferably 0.5 µm to 3 µm, and particularly preferably 1 µm to 2 µm.

The average length of one period of the spiral axis is obtained by the following method. Lengths of one period of five spiral axes are measured based on the cross-sectional image of the cholesteric liquid crystal layer obtained by using a scanning electron microscope or a polarizing microscope. A value obtained by arithmetically averaging the measured values is taken as the average length of one period of the spiral axis. In the cross-sectional view of the cholesteric liquid crystal layer in the thickness direction, in a case where a stripe pattern in which a bright portion and a dark portion are alternately arranged is observed, the length of one period of the spiral axis may be measured based on the stripe pattern. The length of one period of the spiral axis in the stripe pattern corresponds to a distance (that is, a width) from one end of the region (that is, dark portion-bright portion-dark portion-bright portion) including two bright portions and two dark portions to the other end thereof.

Figure 2:
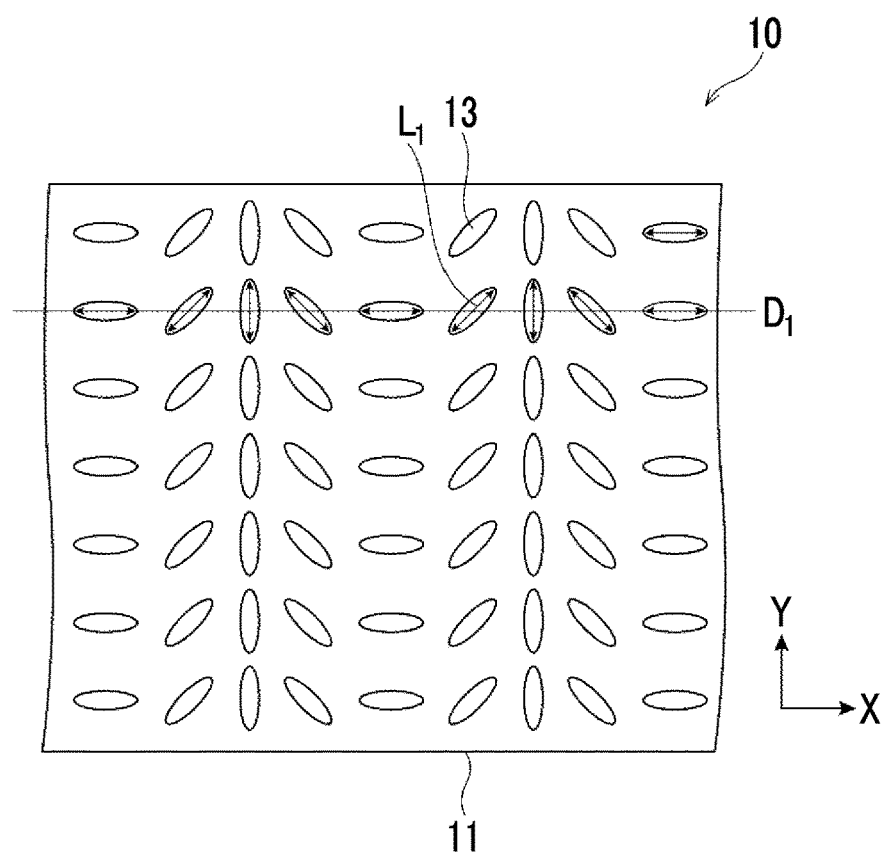
FIG. 2 is a schematic plan view showing an example of a cholesteric liquid crystal layer according to the first embodiment of the present disclosure.

The molecular alignment in the cholesteric liquid crystal layer will be described with reference to FIGS. 1 and 2. FIG. 1 is a schematic cross-sectional view showing an example of the cholesteric liquid crystal layer. FIG. 2 is a schematic plan view showing an example of the cholesteric liquid crystal layer.

In FIG. 1, a direction X and a direction Z indicate each direction of two coordinate axes orthogonal to each other on an observation plane. The direction Z is parallel to a thickness direction of a cholesteric liquid crystal layer 10. The cholesteric liquid crystal layer 10 shown in FIG. 1 has two main surfaces (that is, a main surface 11 and a main surface 12). The cholesteric liquid crystal layer 10 contains a rod-like liquid crystal compound 13. The rod-like liquid crystal compound 13 is spirally arranged along a spiral axis $C_1$. The spiral axis $C_1$ is orthogonal to a molecular axis $L_1$ of the rod-like liquid crystal compound 13. The spiral axis $C_1$ is inclined with respect to a straight line (not shown) orthogonal to each of the two main surfaces (that is, the main surface 11 and the main surface 12) of the cholesteric liquid crystal layer 10. A region in which a direction of the molecular axis $L_1$ is parallel (including a position close to parallel) to an observation direction (meaning a direction orthogonal to the observation plane. The same in the present paragraph) is observed as a dark portion. A region in which the direction of the molecular axis $L_1$ is orthogonal (including a position close to orthogonal) to the observation direction is observed as a bright portion.

In FIG. 2, the direction X and the direction Y indicate directions of two coordinate axes orthogonal to each other on the observation plane. The rod-like liquid crystal compound 13 observed on the main surface 11 of the cholesteric liquid crystal layer 10 shown in FIG. 2 is arranged while being twisted along one direction (that is, one direction of arrangement axis $D_1$) of the in-plane directions of the cholesteric liquid crystal layer 10. Since the rod-like liquid crystal compound 13 is arranged while being twisting as described above, the direction of the molecular axis of the rod-like liquid crystal compound 13 changes as it proceeds in one direction of the arrangement axis $D_1$. As a result, a stripe pattern in which a bright portion and a dark portion are alternately arranged is observed depending on the direction of the molecular axis of the rod-like liquid crystal compound 13 with respect to the observation direction (meaning the direction orthogonal to the observation plane).

Although not shown in the drawings, the rod-like liquid crystal compound 13 observed on the main surface 12 of the cholesteric liquid crystal layer 10 shown in FIG. 1 is also arranged while being twisted along one direction of the in-plane directions of the cholesteric liquid crystal layer 10.

—Liquid Crystal Compound—

The cholesteric liquid crystal layer contains a liquid crystal compound. The cholesteric liquid crystal layer may contain one kind alone or two or more kinds of liquid crystal compounds.

The kind of liquid crystal compound is not limited. As the liquid crystal compound, for example, a known liquid crystal compound that forms a cholesteric liquid crystal can be used.

The liquid crystal compound may have a polymerizable group. The liquid crystal compound may have one kind alone or two or more kinds of polymerizable groups. The liquid crystal compound may have two or more polymerizable groups of the same kind. As the liquid crystal compound has a polymerizable group, the liquid crystal compound can be polymerized. By polymerizing the liquid crystal compound, the stability of the cholesteric liquid crystal can be improved.

Examples of the polymerizable group include a group having an ethylenically unsaturated double bond, a cyclic ether group, and a nitrogen-containing heterocyclic group capable of causing a ring-opening reaction.

Examples of the group having an ethylenically unsaturated double bond include an acryloyl group, a methacryloyl group, an acryloyloxy group, a methacryloyloxy group, a vinyl group, a vinylphenyl group, and an allyl group.

Examples of the cyclic ether group include an epoxy group and an oxetanyl group.

Examples of the nitrogen-containing heterocyclic group capable of causing a ring-opening reaction include an aziridinyl group.

The polymerizable group is preferably at least one selected from the group consisting of a group having an ethylenically unsaturated double bond and a cyclic ether group. Specifically, the polymerizable group is preferably at least one selected from the group consisting of an acryloyl group, a methacryloyl group, an acryloyloxy group, a methacryloyloxy group, a vinyl group, a vinylphenyl group, an allyl group, an epoxy group, an oxetanyl group, and an aziridinyl group, more preferably at least one selected from the group consisting of an acryloyl group, a methacryloyl group, an acryloyloxy group, and a methacryloyloxy group, and particularly preferably at least one selected from the group consisting of an acryloyloxy group and a methacryloyloxy group.

The liquid crystal compound is classified into a rod-like liquid crystal compound and a disk-like liquid crystal compound depending on the chemical structure. The rod-like liquid crystal compound is known as a liquid crystal compound having a rod-like chemical structure. As the rod-like liquid crystal compound, for example, a known rod-like liquid crystal compound can be used. The disk-like liquid crystal compound is known as a liquid crystal compound having a disk-like chemical structure. As the disk-like liquid crystal compound, for example, a known disk-like liquid crystal compound can be used.

The liquid crystal compound is preferably a rod-like liquid crystal compound, and more preferably a rod-like thermotropic liquid crystal compound, from a viewpoint of adjusting optical properties (in particular, diffraction properties of light) of the cholesteric liquid crystal layer.

The rod-like thermotropic liquid crystal compound is a compound having a rod-like chemical structure and exhibiting liquid crystallinity in a specific temperature range. As the rod-like thermotropic liquid crystal compound, for example, a known rod-like thermotropic liquid crystal compound can be used.

Examples of the rod-like thermotropic liquid crystal compound include a compound described in "Makromol. Chem., Volume 190, page 2255 (1989)", "Advanced Materials, Volume 5, page 107 (1993)", U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-513019T (JP-H11-513019T), JP1999-80081A (JP-H11-80081A), JP2001-328973A, or JP2007-279688A. Examples of the rod-like thermotropic liquid crystal compound include the liquid crystal compound represented by General Formula 1 in JP2016-81035A and the compound represented by General Formula (I) or General Formula (II) in JP2007-279688A.

The rod-like thermotropic liquid crystal compound is preferably a compound represented by General Formula (1).

$$Q^1\text{-}L^1\text{-}A^1\text{-}L^3\text{-}M\text{-}L^4\text{-}A^2\text{-}L^2\text{-}Q^2 \quad (1)$$

In General Formula (1), $Q^1$ and $Q^2$ each independently represent a polymerizable group, $L^1$, $L^2$, $L^3$, and $L^4$ each independently represent a single bond or a divalent linking group, $A^1$ and $A^2$ each independently represent a divalent hydrocarbon group having 2 to 20 carbon atoms, and M represents a mesogenic group.

In General Formula (1), examples of the polymerizable group represented by $Q^1$ and $Q^2$ include the polymerizable group. Preferable aspects of the polymerizable group represented by $Q^1$ and $Q^2$ are the same as the polymerizable group described above.

In General Formula (1), the divalent linking groups represented by $L^1$, $L^2$, $L^3$, and $L^4$ are preferably divalent linking groups selected from the group consisting of —O—, —S—, —CO—, —N—, —CO—O—, —O—CO—O—, —CO—N—, —NR—CO—, —O—CO—, —O—CO—NR—, —NR—OO—, and NR—CO—NR—. R in the divalent linking group represents an alkyl group having 1 to 7 carbon atoms or a hydrogen atom.

In General Formula (1), it is preferable that at least one of $L^3$ and $L^4$ is —O—CO—O—.

In General Formula (1), $Q^1$-$L^1$- and $Q^2$-$L^2$- are each independently preferably $CH_2$=CH—CO—O—, $CH_2$=C($CH_3$)—CO—O—, or $CH_2$=C(Cl)—CO—O—, and more preferably $CH_2$=CH—CO—O—.

In General Formula (1), the divalent hydrocarbon group having 2 to 20 carbon atoms represented by $A^1$ and $A^2$ is preferably an alkylene group having 2 to 12 carbon atoms, an alkenylene group having 2 to 12 carbon atoms, or an alkynylene group having 2 to 12 carbon atoms, and more preferably an alkylene group having 2 to 12 carbon atoms. The divalent hydrocarbon group is preferably in the form of a chain. The divalent hydrocarbon group may contain oxygen atoms that are not adjacent to each other or sulfur atoms that are not adjacent to each other. The divalent hydrocarbon group may have a substituent. Examples of the substituent include a halogen atom (for example, fluorine atom, chlorine atom, and bromine atom), a cyano group, a methyl group, and an ethyl group.

In General Formula (1), a mesogenic group represented by M is a group that forms a main skeleton of the liquid crystal compound that contributes to the formation of the liquid crystal. Regarding the mesogenic group represented by M, for example, the description of "FlussigeKristalle in Tabellen II" (VEB Deutsche Verlag fur Grundstoff Industrie, Leipzig, published in 1984) (in particular, pages 7 to 16) and "Liquid Crystal Handbook" (Liquid Crystal Handbook Editorial Committee, Maruzen, 2000) (in particular, chapter 3) can be referred to.

In General Formula (1), specific examples of the specific structure of the mesogenic group represented by M include the structure described in paragraph [0086] of JP2007-279688A.

In General Formula (1), the mesogenic group represented by M is preferably a group containing at least one cyclic structure selected from the group consisting of an aromatic hydrocarbon group, a heterocyclic group, and an alicyclic hydrocarbon group, and more preferably a group containing an aromatic hydrocarbon group.

In General Formula (1), the mesogenic group represented by M is preferably a group containing 2 to 5 aromatic hydrocarbon groups, and more preferably a group containing 3 to 5 aromatic hydrocarbon groups.

In General Formula (1), the mesogenic group represented by M is preferably a group containing 3 to 5 phenylene groups and in which the phenylene groups are linked to each other by —CO—O—.

In General Formula (1), the cyclic structure (for example, an aromatic hydrocarbon group, a heterocyclic group, and an alicyclic hydrocarbon group) contained in the mesogenic group represented by M may have a substituent. Examples of the substituent include an alkyl group having 1 to 10 carbon atoms (for example, a methyl group).

Specific examples of the compound represented by General Formula (1) are shown below. However, the compound represented by General Formula (1) is not limited to the compounds shown below. In the chemical structure of the compounds shown below, "-Me" represents a methyl group.

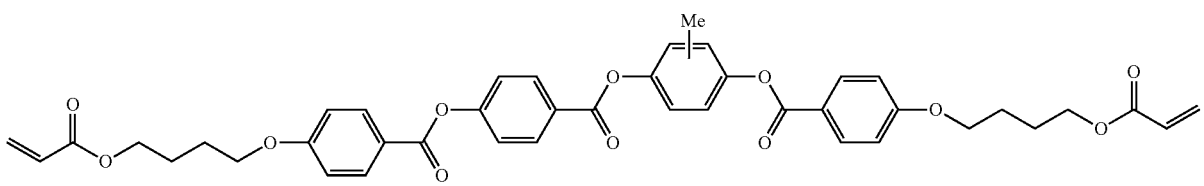

-continued

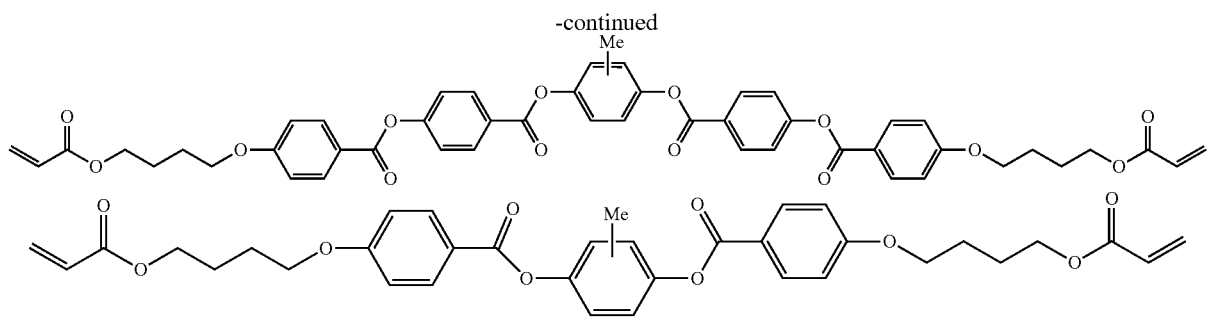

Specific examples of the rod-like thermotropic liquid crystal compound are shown below. However, the rod-like thermotropic liquid crystal compound is not limited to the compounds shown below.

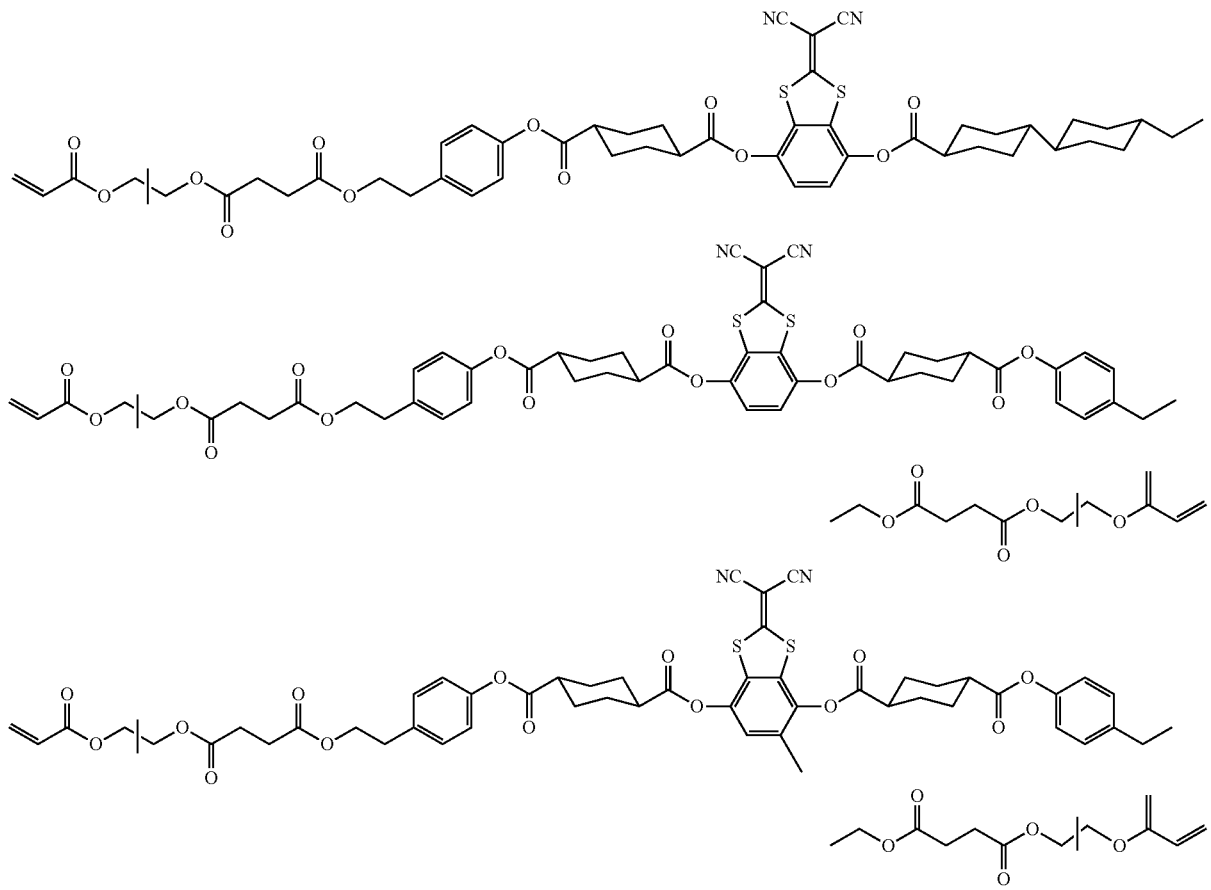

The liquid crystal compound may be a synthetic product synthesized by a known method or a commercially available product. Commercially available products of liquid crystal compounds are available from Tokyo Chemical Industry Co., Ltd. and Merck, for example.

From a viewpoint of heat resistance, the content of the liquid crystal compound is preferably 70% by mass or greater, more preferably 80% by mass or greater, and particularly preferably 90% by mass or greater, with respect to a total mass of the cholesteric liquid crystal layer. An upper limit of the content of the liquid crystal compound is not limited. The content of the liquid crystal compound may be determined in a range of 100% by mass or less with respect to the total mass of the cholesteric liquid crystal layer. In a case where the cholesteric liquid crystal layer contains a component other than the liquid crystal compound, the content of the liquid crystal compound may be determined in a range of less than 100% by mass (preferably 98% by mass or less, or 95% by mass or less) with respect to the total mass of the cholesteric liquid crystal layer. The content of the liquid crystal compound is preferably 70% by mass or greater and less than 100% by mass, more preferably 80% by mass or greater and less than 100% by mass, and particularly preferably 90% by mass or greater and less than 100% by mass with respect to the total mass of the cholesteric liquid crystal layer.

—Other Components—

The cholesteric liquid crystal layer may contain a component other than the liquid crystal compound (hereinafter, referred to as "other component" in the present paragraph). Examples of other components include a chiral agent, a solvent, an alignment regulator, a polymerization initiator, a leveling agent, an alignment aid, and a sensitizer.

—Layer Structure of Liquid Crystal Layer—

The transparent screen according to the first embodiment of the present disclosure may have one or two or more cholesteric liquid crystal layers. The number of cholesteric liquid crystal layers is preferably two or more from a viewpoint of expanding the viewing angle of the transparent screen.

In a case where the transparent screen according to the first embodiment of the present disclosure has two or more cholesteric liquid crystal layers, it is preferable that the directions of the spiral axes derived from the liquid crystal compounds of at least two cholesteric liquid crystal layers are different from each other. Since the directions of the spiral axes derived from the liquid crystal compounds of at least two cholesteric liquid crystal layers are different from each other, the viewing angle of the transparent screen can be increased.

In a case where the transparent screen according to the first embodiment of the present disclosure has two or more cholesteric liquid crystal layers, the two or more cholesteric liquid crystal layers may be disposed adjacent to each other or separated from each other. In a case where the transparent screen according to the first embodiment of the present disclosure has two or more cholesteric liquid crystal layers, at least two cholesteric liquid crystal layers (preferably all cholesteric liquid crystals) are preferably disposed (that is, laminated) adjacent to each other.

—Thickness of Liquid Crystal Layer—

A thickness of the cholesteric liquid crystal layer is not limited. From a viewpoint of film strength, an average thickness of the cholesteric liquid crystal layer is preferably 0.1 µm or greater, more preferably 0.5 µm or greater, and particularly preferably 1 µm or greater. From a viewpoint of total light transmittance, the average thickness of the cholesteric liquid crystal layer is preferably 500 µm or less, more preferably 200 µm or less, and particularly preferably 100 µm or less.

The average thickness of the cholesteric liquid crystal layer is obtained by the following method. Thicknesses at 5 points are measured based on the cross-sectional image of the cholesteric liquid crystal layer obtained by using a scanning electron microscope or a polarizing microscope. A value obtained by arithmetically averaging the measured values is taken as the average thickness of the cholesteric liquid crystal layer. However, in a case where the transparent screen according to the first embodiment of the present disclosure has two or more cholesteric liquid crystal layers, the thickness of each cholesteric liquid crystal layer is obtained by the method, and then a value obtained by arithmetically averaging the measured values is denoted as the average thickness of the cholesteric liquid crystal layer.

(Other Layers)

The transparent screen according to the first embodiment of the present disclosure may have a layer other than the cholesteric liquid crystal layer (hereinafter, referred to as "other layer" in the present paragraph) in addition to the cholesteric liquid crystal layer. The kinds of other layers are not limited as long as the kinds do not deviate from the gist of the present disclosure. Examples of other layers include a base material, an alignment layer, and an easy-adhesion layer.

—Base Material—

The transparent screen according to the first embodiment of the present disclosure may have a base material. Depending on the base material, the strength of the transparent screen can be improved.

The total light transmittance of the base material is preferably 70% or greater, more preferably 80% or greater, and particularly preferably 90% or greater. An upper limit of the total light transmittance of the base material is not limited. The total light transmittance of the base material may be determined in a range of 100% or less, for example. The total light transmittance of the base material is measured using a known spectrophotometer (for example, haze meter NDH 2000, Nippon Denshoku Industries Co., Ltd.).

The base material is preferably a base material containing a polymer. Examples of the base material containing a polymer include a polyester-based base material (for example, polyethylene terephthalate and polyethylene naphthalate), a cellulose-based base material (for example, diacetyl cellulose and triacetyl cellulose (abbreviation: TAC)), a polycarbonate-based base material, a poly(meth)acrylic base material (for example, a poly(meth)acrylate (for example, polymethylmethacrylate)), a polystyrene-based base material (for example, polystyrene and acrylonitrile-styrene copolymer), an olefin-based base material (for example, polyethylene, polypropylene, polyolefin having a cyclic structure (for example, norbornene structure), and an ethylene-propylene copolymer), polyamide-based base material (for example, polyvinyl chloride, nylon, and aromatic polyamide), a polyimide-based base material, a polysulfone-based base material, a polyether sulfone-based base material, a polyether ether ketone-based base material, a polyphenylene sulfide-based base material, a vinyl alcohol-based base material, a polyvinylidene chloride-based base material, a polyvinyl butyral-based base material, a polyoxymethylene-based base material, and an epoxy resin-based base material. The base material may be a base material containing two or more kinds of polymers (that is, a blend polymer). The base material is preferably a cellulose-based base material, and more preferably a base material containing triacetyl cellulose.

The shape of the base material is not limited. The shape of the base material may be determined depending on the use and the installation location, for example. The base material is preferably a flat plate-like base material.

A thickness of the base material is preferably in a range of 30 µm to 500 µm, and more preferably in a range of 40 µm to 250 µm, from a viewpoint of manufacturing suitability, manufacturing cost, and optical properties.

—Alignment Layer—

The transparent screen according to the first embodiment of the present disclosure may have an alignment layer. According to the alignment layer, an alignment regulating force can be imparted to the liquid crystal compound.

The alignment layer is preferably disposed between the base material and the cholesteric liquid crystal layer.

As the alignment layer, for example, a known alignment layer having a function of imparting an alignment regulating force to the liquid crystal compound can be used. The alignment layer may be an alignment layer in which the alignment function is generated by imparting an electric field, imparting a magnetic field, or irradiating light.

A thickness of the alignment layer is preferably in a range of 0.1 μm to 10 μm, and more preferably in a range of 1 μm to 5 μm.

—Easy-Adhesion Layer—

The transparent screen according to the first embodiment of the present disclosure may have an easy-adhesion layer. According to the easy-adhesion layer, an adhesive force can be imparted to the surface of the object to be adhered (for example, a cholesteric liquid crystal layer). As a result, for example, the adhesiveness between layers is improved.

The easy-adhesion layer is preferably disposed between the base material and the cholesteric liquid crystal layer. The easy-adhesion layer disposed between the base material and the cholesteric liquid crystal layer is preferably in contact with the base material and the cholesteric liquid crystal layer, respectively. The easy-adhesion layer may be disposed between the base material and the alignment layer.

As the easy-adhesion layer, for example, a known easy-adhesion layer having a function of imparting an adhesive force to a surface of an object to be adhered can be used.

A thickness of the easy-adhesion layer is preferably in a range of 0.01 μm to 10 μm, and more preferably in a range of 0.1 μm to 5 μm.

[Shape]

The shape of the transparent screen according to the first embodiment of the present disclosure is not limited. The shape of the transparent screen according to the first embodiment of the present disclosure may be determined depending on the use and the installation location, for example. The transparent screen according to the first embodiment of the present disclosure is preferably a flat plate-like transparent screen.

[Thickness]

The thickness of the transparent screen according to the first embodiment of the present disclosure is not limited. The thickness of the transparent screen according to the first embodiment of the present disclosure is preferably in a range of 1 μm to 500 μm, more preferably in a range of 2 μm to 250 μm, and particularly preferably in a range of 5 μm to 100 μm from a viewpoint of the strength.

[Use]

Since the transparent screen according to the first embodiment of the present disclosure is excellent in color reproducibility of an image, the transparent screen can be used as a screen for displaying an image. In the transparent screen according to the first embodiment of the present disclosure, for example, an image may be displayed on at least one main surface out of the two main surfaces.

The transparent screen according to the first embodiment of the present disclosure is preferably a transmissive transparent screen. In the transmissive transparent screen, an image is displayed using light transmitted through the screen. The transmissive transparent screen is used as a rear projection screen described later, for example.

The transparent screen according to the first embodiment of the present disclosure is preferably used as a rear projection screen, for example. In a case where the transparent screen according to the first embodiment of the present disclosure is used as a rear projection screen, the observer can visually recognize an image displayed on the front surface of the transparent screen by projecting the image from a rear surface side of the transparent screen. As a device for projecting an image on the transparent screen according to the first embodiment of the present disclosure, a known projector (for example, a moving picture projector) can be used.

The transparent screen according to the first embodiment of the present disclosure is preferably used by being attached to a window of an automobile, for example. By using the transparent screen according to the first embodiment of the present disclosure attached to the window of an automobile, an image can be displayed on the window of the automobile. In a case where the transparent screen according to the first embodiment of the present disclosure is attached to a window of an automobile and used, it is preferable that an image is projected from a rear surface side (that is, inner side of the automobile) of the transparent screen using a projector installed in the automobile (for example, a moving picture projector).

The transparent screen according to the first embodiment of the present disclosure may be used by being attached to various structures (preferably a structure having transparency) other than the window of the automobile. In addition, the transparent screen according to the first embodiment of the present disclosure may be used as a diffraction grating.

[Manufacturing Method]

A method for manufacturing a transparent screen according to the first embodiment of the present disclosure is not limited as long as it is a method capable of manufacturing a transparent screen in which a half width of the peak observed in the specific strength distribution is 2 degrees or greater. As described above, for example, by forming the cholesteric liquid crystal layer, the half width of the peak observed in the specific strength distribution can be easily controlled. Hereinafter, a preferable method for manufacturing a transparent screen having a cholesteric liquid crystal layer, which is an example of the transparent screen according to the first embodiment of the present disclosure, will be described. However, the method for manufacturing a transparent screen according to the first embodiment of the present disclosure is not limited to the method described below.

The method for manufacturing a transparent screen according to the first embodiment of the present disclosure preferably includes a step (hereinafter, may be referred to as "step (A)") of applying a composition containing a liquid crystal compound and a chiral agent on a base material and a step (hereinafter, may be referred to as "step (B)") of imparting a shear force to a surface of the composition applied on the base material. A cholesteric liquid crystal layer can be formed on the base material through the step (A) and the step (B). In the step (B), by imparting a shear force to the composition containing the liquid crystal compound and the chiral agent, the half width of the peak observed in the specific strength distribution can be increased, and thus a transparent screen excellent in color reproducibility of an image can be manufactured. In addition, by repeating the step (A) and the step (B), a plurality of cholesteric liquid crystals can be formed on the base material. Hereinafter, each step will be specifically described.

(Step (A))

In the step (A), a composition containing a liquid crystal compound and a chiral agent is applied on the base material.

In the present disclosure, "applying a composition on a base material" is not limited to bringing the composition into direct contact with the base material, but also includes bringing the composition into contact with the base material via any layer. Any layer may be one of the constituent elements of the base material, or may be a layer formed on the base material before applying of the composition. Examples of the any layer include an alignment layer described in the "alignment layer" section. The method of forming the alignment layer will be described later.

—Base Material—

Examples of the base material used in the step (A) include the base material described in the "base material" section. The preferable aspect of the base material used in the step (A) is the same as the base material described in the "base material" section. An alignment layer may be disposed in advance on the surface of the base material used in the step (A).

—Liquid Crystal Compound—

As the liquid crystal compound contained in the composition, for example, a liquid crystal compound described in the "liquid crystal compound" section can be used. The preferable aspect of the liquid crystal compound contained in the composition is the same as the liquid crystal compound described in the "liquid crystal compound" section.

The composition may contain one kind alone or two or more kinds of liquid crystal compounds.

The content of the liquid crystal compound is preferably 70% by mass or greater, more preferably 80% by mass or greater, and particularly preferably 90% by mass or greater with respect to the solid content mass of the composition. An upper limit of the content of the liquid crystal compound may be determined depending on the content of components other than the liquid crystal compound. The content of the liquid crystal compound may be determined in a range of less than 100% by mass (preferably 98% by mass or less, or 95% by mass or less) with respect to the solid content mass of the composition.

—Chiral Agent—

The kind of chiral agent is not limited. Examples of the chiral agent include known chiral agents (for example, chiral agent described in "Liquid Crystal Device Handbook, Chapter 3, Section 4-3, TN, Chiral Agent for STN, page 199, Japan Society for the Promotion of Science, 42nd Committee, 1989").

Many chiral agents contain asymmetric carbon atoms. However, the chiral agent is not limited to compounds containing asymmetric carbon atoms. Examples of the chiral agent include an axial asymmetric compound containing no asymmetric carbon atom and a planar asymmetric compound. Examples of the axial asymmetric compound or the planar asymmetric compound include binaphthyl, helicene, paracyclophane, and derivatives thereof.

The chiral agent may have a polymerizable group. For example, by reacting a chiral agent having a polymerizable group with a liquid crystal compound having a polymerizable group, a polymer having a constitutional unit derived from the chiral agent and a constitutional unit derived from the liquid crystal compound is obtained.

Examples of the polymerizable group in the chiral agent include the polymerizable group described in the "liquid crystal compound" section. A preferable aspect of the polymerizable group in the chiral agent is the same as the polymerizable group described in the "liquid crystal compound" section. The kind of the polymerizable group in the chiral agent is preferably the same as the kind of the polymerizable group in the liquid crystal compound.

Examples of the chiral agent exhibiting a strong twisting force include chiral agents described in JP2010-181852A, JP2003-287623A, JP2002-80851A, JP2002-80478A, or JP2002-302487A. For the isosorbide compounds described in such documents, isomannide compounds having a corresponding structure can also be used as a chiral agent. In addition, for the isomannide compounds described in such documents, isosorbide compounds having a corresponding structure can also be used as a chiral agent.

The content of the chiral agent is preferably 0.1% by mass to 20.0% by mass, more preferably 0.2% by mass to 15.0% by mass, and particularly preferably 0.5% by mass to 10.0% by mass, with respect to the solid content mass of the composition.

—Other Components—

The composition may contain components other than the components (hereinafter, referred to as "other components" in the present paragraph). Other components include, for example, a solvent, an alignment regulator, a polymerization initiator, a leveling agent, an alignment aid, and a sensitizer.

As the solvent, an organic solvent is preferable. Examples of the organic solvent include an amide solvent (for example, N, N-dimethylformamide), a sulfoxide solvent (for example, dimethyl sulfoxide), a heterocyclic compound (for example, pyridine), a hydrocarbon solvent (for example, benzene and hexane), an alkyl halide solvent (for example, chloroform, dichloromethane), an ester solvent (for example, methyl acetate and butyl acetate), a ketone solvent (for example, acetone, methyl ethyl ketone, and cyclohexanone), and an ether solvent (for example, tetrahydrofuran and 1, 2-dimethoxyethane). The organic solvent is preferably at least one selected from the group consisting of an alkyl halide solvent and a ketone solvent, and more preferably a ketone solvent.

The composition may contain one kind alone or two or more kinds of solvents.

The content of the solid content in the composition is preferably 25% by mass to 40% by mass, and more preferably 25% by mass to 35% by mass, with respect to the total mass of the composition.

Examples of the alignment regulator include the compounds described in paragraphs to paragraph [0030] of JP2012-211306A, compounds described in paragraph [0037] to paragraph [0044] of JP2012-101999A, fluorine-containing (meth)acrylate polymers described in paragraph [0018] to paragraph [0043] of JP2007-272185A, and compounds described in detail with the synthesis method in JP2005-099258A. A polymer containing the polymerization unit of the fluoroaliphatic group-containing monomer in an amount of more than 50% by mass of the total polymerization unit described in JP2004-331812A may be used as the alignment regulator.

Examples of the alignment regulator also include a vertical alignment agent. Examples of the vertical alignment agent include a boronic acid compound and/or onium salts described in JP2015-38598A, and onium salts described in JP2008-26730A.

In a case where the composition contains an alignment regulator, the content of the alignment regulator is preferably more than 0% by mass and 5.0% by mass or less, and more preferably 0.3% by mass to 2.0% by mass with respect to the solid content mass of the composition.

Examples of the polymerization initiator include a photopolymerization initiator and a thermal polymerization initiator.

The polymerization initiator is preferably a photopolymerization initiator from a viewpoint of suppressing deformation of the base material due to heat and deterioration of the composition. Examples of the photopolymerization initiator include an α-carbonyl compound (for example, the compound described in U.S. Pat. No. 2,367,661A or U.S. Pat. No. 2,367,670A), acyloin ether (for example, the compound described in U.S. Pat. No. 2,448,828A), an α-hydrocarbon substituted aromatic acyloin compound (for example, the compound described in U.S. Pat. No. 2,722,512A), a polynuclear quinone compound (for example, compounds described in U.S. Pat. No. 3,046,127A or U.S. Pat. No. 2,951,758A), a combination of a triarylimidazole dimer with a p-aminophenyl ketone (for example, a compound described in U.S. Pat. No. 3,549,367A), an acridine compound (for example, compounds described in JP1985-105667A (JP-S60-105667A) or U.S. Pat. No. 4,239,850A), a phenazine compound (for example, compounds described in JP1985-105667A (JP-S60-105667A) or U.S. Pat. No. 4,239,850A), an oxadiazole compound (for example, the compound described in U.S. Pat. No. 4,212,970A), and an acylphosphine oxide compound (for example, compound described in JP1988-40799B (JP-S63-40799B), JP1993-29234B (JP-H5-29234B), JP1998-95788B (JP-H10-95788B), or JP1998-29997B (JP-H10-29997B)).

In a case where the composition contains a polymerization initiator, the content of the polymerization initiator is preferably 0.5% by mass to 5.0% by mass, and more preferably 1.0% by mass to 4.0% by mass with respect to the solid content mass of the composition.

—Method for Manufacturing Composition—

A method for manufacturing a composition is not limited. Examples of the method for manufacturing a composition include a method of mixing each of the components. As the mixing method, a known mixing method can be used. In the method for manufacturing a composition, after mixing each of the components, the obtained mixture may be filtered.

—Applying Method—

A method of applying the composition is not limited. Examples of the applying method of the composition include an extrusion die coater method, a curtain coating method, a dip coating method, a spin coating method, a print coating method, a spray coating method, a slot coating method, a roll coating method, a slide coating method, a blade coating method, a gravure coating method, and a wire bar method.

—Applying Amount—

An applying amount of the composition is not limited. An applying amount of the composition may be determined depending on a desired thickness of a cholesteric liquid crystal layer or a thickness of the composition before the shear force described in the "step (B)" section below is imparted.

(Step (B))

In the step (B), a shear force is imparted to a surface of the applied composition.

—Means for Imparting Shear Force—

Examples of means for imparting a shear force include a blade, an air knife, a bar, and an applicator. In the step (B), it is preferable to impart a shear force to the surface of the composition by using a blade or an air knife, and it is more preferable to impart a shear force to the surface of the composition by using a blade.

In the method of imparting a shear force to the surface of the composition using a blade, it is preferable to scrape the surface of the composition by the blade. In the method, a thickness of the composition may change before and after imparting the shear force. The thickness of the composition after the shear force is imparted by the blade may be ½ or less, or ⅓ or less, with respect to the thickness of the composition before the shear force is imparted. The thickness of the composition after the shear force is imparted by the blade is preferably ¼ or greater with respect to the thickness of the composition before the shear force is imparted.

A material of the blade is not limited. Examples of the material of the blade include metal (for example, stainless steel) and resin (for example, Teflon (registered trademark) and polyether ether ketone (PEEK)).

The shape of the blade is not limited. Examples of the shape of the blade include a plate shape.

The blade is preferably a metal plate-like member from a viewpoint of easily imparting a shear force to the composition.

A thickness of a tip end portion of the blade in contact with the composition is preferably 0.1 mm or greater, and more preferably 1 mm or greater, from a viewpoint of easily imparting a shear force to the composition. An upper limit of the thickness of the blade is not limited. The thickness of the blade may be determined in a range of 10 mm or less, for example.

In the method of imparting a shear force to the surface of the composition using an air knife, the shear force is imparted to the surface of the composition by blowing compressed air onto the surface of the composition with an air knife. A shear rate imparted to the composition can be adjusted depending on the rate (that is, flow rate) at which the compressed air is blown.

The blowing direction of the compressed air by the air knife may be the same direction as or opposite to the transport direction of the composition. The blowing direction of the compressed air by the air knife is preferably the same as the transport direction of the composition from a viewpoint of preventing the fragments of the composition scraped off by the compressed air from adhering to the composition remaining on the base material.

—Shear Rate—

The higher the shear rate in the step (B), the higher the alignment accuracy of the cholesteric liquid crystal layer can be formed. The shear rate is preferably 1,000 seconds$^{-1}$ or greater, more preferably 10,000 seconds$^{-1}$ or greater, and particularly preferably 30,000 seconds$^{-1}$ or greater. An upper limit of the shear rate is not limited. The shear rate may be determined in a range of $1.0 \times 10^6$ seconds$^{-1}$ or less, for example.

Hereinafter, how to obtain the shear rate will be described. For example, in a case where a shear force is imparted using a blade, the shear rate is obtained by "V/d" when a minimum distance between the blade and the base material is denoted as "d" and the transport rate of the composition in contact with the blade (that is, relative rate between the composition and the blade) is denoted as "V". In addition, for example, in a case where a shear force is imparted using an air knife, the shear rate is obtained by "V/2h" when the thickness of the composition after the shearing is denoted as "h" and the relative rate between a surface of the composition and a surface of the base material is denoted as "V".

—Surface Temperature of Composition—

A surface temperature of the composition when the shear force is imparted may be determined depending on a phase transition temperature of the liquid crystal compound contained in the composition. The surface temperature of the composition when the shear force is imparted is preferably 50° C. to 120° C., and more preferably 60° C. to 100° C. By adjusting the surface temperature of the composition within the range, a cholesteric liquid crystal layer having high alignment accuracy can be obtained. The surface temperature of the composition is measured using a radiation thermometer of which emissivity is calibrated by a temperature value measured by a contactless thermometer. The surface temperature of the composition is measured within 10 cm from the surface on the opposite sides (that is, the rear side) to the measurement surface in a state in which a reflection article is absent.

—Thickness of Composition—

A thickness of the composition before the shear force is imparted is preferably in a range of 30 µm or less, and more preferably in a range of 15 µm to 25 µm, from a viewpoint of forming a cholesteric liquid crystal layer having high alignment accuracy.

The thickness of the composition after the shear force is imparted is preferably in a range of 10 µm or less, and more preferably in a range of 7 µm or less, from a viewpoint of forming a cholesteric liquid crystal layer having high alignment accuracy. A lower limit of the thickness of the composition after the shear force is imparted is not limited. The thickness of the composition after the shear force is imparted is preferably in the range of 5 µm or greater.

(Step (C))

In a case where the composition contains a solvent, the method for manufacturing a transparent screen according to the first embodiment of the present disclosure preferably includes a step (hereinafter, there is a case of step (C)) of adjusting the content of the solvent in the applied composition in a range of 50% by mass or less with respect to the total mass of the composition, between the step (A) and the step (B). By adjusting the content of the solvent in the composition to the range of 50% by mass or less, a cholesteric liquid crystal layer having high alignment accuracy can be formed.

In the step (C), the content of the solvent in the composition is preferably 40% by mass or less, and more preferably 30% by mass or less, with respect to the total mass of the composition. A lower limit of the content of the solvent in the applied composition is not limited. The content of the solvent in the applied composition may be 0% by mass, or may exceed 0% by mass with respect to the total mass of the composition. The content of the solvent in the applied composition is preferably 10% by mass or greater from a viewpoint of easily suppressing deterioration of the surface condition of the applied composition.

The content of the solvent in the composition is measured by an absolute dry method. Hereinafter, a specific procedure of the measurement method will be described. A sample collected from the composition is dried at 60° C. for 24 hours, and then a mass change of the sample before and after drying (that is, the difference between the mass of the sample after drying and the mass of the sample before drying) is obtained. The content of the solvent in the sample is obtained based on the mass change of the sample before and after drying. An arithmetic mean of the values obtained by performing the operation three times is taken as the content of the solvent.

In the step (C), examples of the method of adjusting the content of the solvent in the applied composition include drying.

As means for drying the composition, known drying means can be used. Examples of drying means include an oven, a hot air blower, and an infrared (IR) heater.

In the drying using a hot air blower, hot air may be directly applied to the composition, or hot air may be applied to a surface opposite to the surface on which the composition of the base material is disposed. In addition, a diffusion plate may be installed in order to suppress the surface of the composition from flowing due to hot air.

Drying may be performed by inhalation. For drying by inhalation of air, a decompression chamber having an exhaust mechanism can be used, for example. By inhaling the gas around the composition, the content of the solvent in the composition can be reduced.

Drying conditions are not limited as long as the content of the solvent in the composition can be adjusted to a range of 50% by mass or less. The drying conditions may be determined depending on the components contained in the composition, the applying amount of the composition, and the transport rate.

(Step (D))

In a case where the composition contains a polymerizable compound (for example, a liquid crystal compound having a polymerizable group or a chiral agent having a polymerizable group), a method for manufacturing a transparent screen according to the first embodiment of the present disclosure preferably includes a step (hereinafter, may be referred to as "step (D)" in some cases) of curing the composition to which the shear force is imparted after the step (B). By curing the composition in the step (D), a molecular arrangement of the liquid crystal compound can be fixed.

Examples of the method for curing the composition include heating and irradiation with active energy rays. In the step (D), from a viewpoint of manufacturing suitability, it is preferable to cure the composition by irradiating the composition to which a shear force is imparted with active energy rays.

Examples of the active energy rays include $\alpha$-rays, $\gamma$-rays, X-rays, ultraviolet rays, infrared rays, visible rays, and electron beams. The active energy ray is preferably ultraviolet rays from a viewpoint of curing sensitivity and availability of the device.

Examples of light sources of ultraviolet rays include lamps (for example, tungsten lamps, halogen lamps, xenon lamps, xenon flash lamps, mercury lamps, mercury xenon lamps, and carbon arc lamps), lasers (for example, semiconductor lasers, helium neon lasers, argon ion lasers, helium cadmium lasers, and Yttrium Aluminum Garnet (YAG) lasers, light emitting diodes, and cathode ray tubes.

A peak wavelength of ultraviolet rays emitted from the light source of ultraviolet rays is preferably 200 nm to 400 nm.

An exposure amount of ultraviolet rays (also referred to as integrated light amount) is preferably 100 mJ/cm$^2$ to 500 mJ/cm$^2$.

(Other Steps)

A method for manufacturing a transparent screen according to the first embodiment of the present disclosure may include steps other than the steps. The method for manufacturing a transparent screen according to the first embodiment of the present disclosure may include a step of forming an alignment layer on a base material, for example. The step of forming the alignment layer on the base material is preferably performed before the step (A).

Examples of the method for forming the alignment layer include rubbing treatment of an organic compound (preferably a polymer), oblique vapor deposition of an inorganic compound, and formation of a layer having microgrooves.

(Manufacturing Method)

A method for manufacturing a transparent screen according to the first embodiment of the present disclosure may be carried out by a roll-to-roll method. In the roll-to-roll method, for example, each step is carried out while continuously transporting a long base material. The method for manufacturing a transparent screen according to the first embodiment of the present disclosure may be carried out using a base material that is transported one by one.

Figure 3:
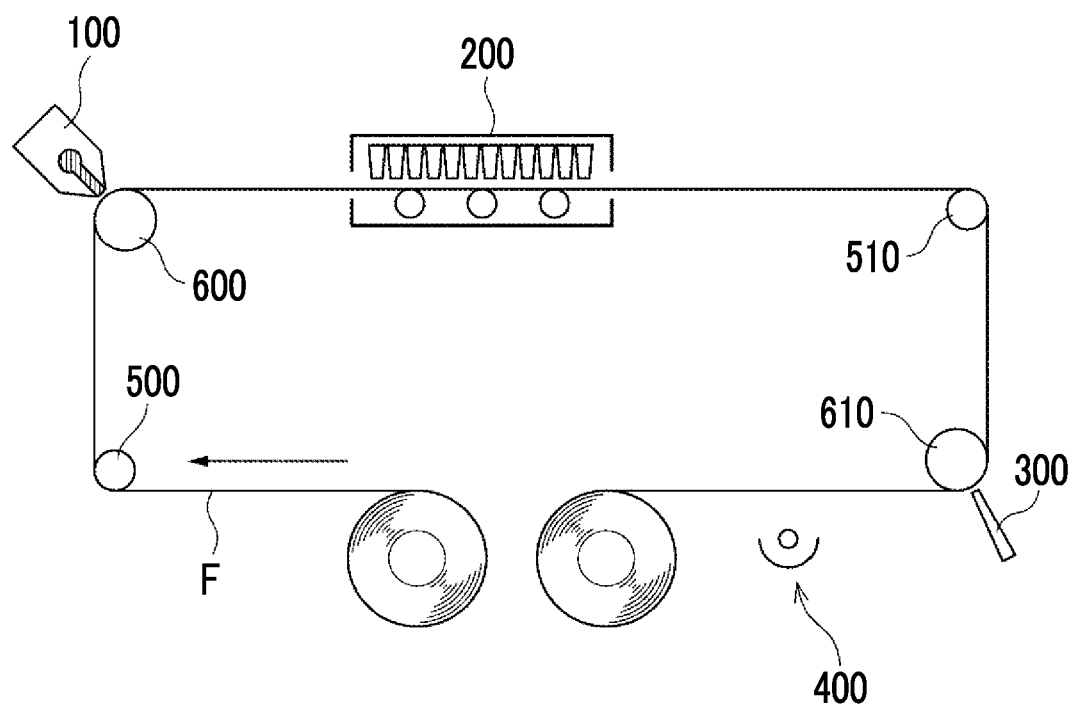
FIG. 3 is a schematic view showing an example of a method for manufacturing a transparent screen according to the first embodiment of the present disclosure.

The method for manufacturing a transparent screen according to the first embodiment of the present disclosure will be described with reference to FIG. 3. FIG. 3 is a schematic view showing an example of the method for manufacturing a transparent screen according to the first embodiment of the present disclosure.

In FIG. 3, the transparent screen is manufactured by a roll-to-roll method. The long base material F wound in a roll shape is transported in a direction of arrow by a transport roll 500. The transport rate of the base material F is preferably 10 m/min to 100 m/min.

A composition is applied to the base material F that has passed through the transport roll 500 by a coating device 100 (step (A)). The composition includes a liquid crystal compound, a chiral agent, and a solvent. The application of the composition by the coating device 100 is performed in a region where the base material F is wound on a backup roll 600. Hereinafter, preferable aspects of the backup roll 600 will be described.

The surface of the backup roll 600 may be subjected to hard chrome plating, for example. A thickness of the plating is preferably 40 μm to 60 μm.

A surface roughness Ra of the backup roll 600 is preferably 0.1 μm or less.

The surface temperature of the backup roll 600 may be controlled in an any temperature range by temperature control means. The surface temperature of the backup roll 600 may be determined depending on the composition of the composition, the curing performance of the composition, and the heat resistance of the base material. The surface temperature of the backup roll 600 is preferably 40° C. to 120° C., and more preferably 40° C. to 100° C., for example. Examples of the temperature control means of the backup roll 600 include heating means and cooling means. Examples of the heating means include induction heating, water heating, and oil heating. Examples of the cooling means include cooling with cooling water.

A diameter of the backup roll 600 is preferably 100 mm to 1,000 mm, more preferably 100 mm to 800 mm, and particularly preferably 200 mm to 700 mm.

A lap angle of the base material F with respect to the backup roll 600 is preferably 60 degrees or greater, and more preferably 90 degrees or greater. In addition, an upper limit of the lap angle can be set to 180 degrees, for example. The "lap angle" means an angle formed by a transport direction of the base material when the base material comes into contact with the backup roll and a transport direction of the base material when the base material is separated from the backup roll.

After the composition is applied on the base material F by the coating device 100, the composition is dried by a drying device 200 (step (C)). By drying the composition, the content of the solvent in the composition is adjusted.

After the composition is dried by the drying device 200, an upper surface of the composition that has passed through a transport roll 510 is scraped off by using a blade 300 to impart a shear force to the surface of the composition (step (B)). The shear force is imparted along the transport direction of the composition (that is, the transport direction of the base material). The imparting of the shear force by the blade 300 is performed in a region where the base material F is wound on the backup roll 610.

A preferable aspect of the backup roll 610 is the same as that of the backup roll 600. A surface temperature of the backup roll 610 is preferably 50° C. to 120° C., and more preferably 60° C. to 100° C., for example.

After imparting a shear force to the composition, the composition is cured by irradiating the composition with active energy rays from a light source 400 (step (D)). By curing the composition, a cholesteric liquid crystal layer is formed.

The transparent screen obtained through each of the steps described above has a base material F and the cholesteric liquid crystal layer in this order. In addition, in the method for manufacturing a transparent screen shown in FIG. 3, by using the base material F having an alignment layer, it is possible to manufacture a transparent screen having the base material F, the alignment layer, and the cholesteric liquid crystal layer in this order.

From the viewpoint of color reproducibility of an image, it is preferable that the transparent screen according to the first embodiment of the present disclosure has a part or all of the constituent elements of the transparent screen according to each of the following embodiments.

<Transparent Screen According to Second Embodiment>

The transparent screen according to a second embodiment of the present disclosure has at least one cholesteric liquid crystal layer containing a liquid crystal compound, in a cross-sectional view of the cholesteric liquid crystal layer in a thickness direction, a spiral axis derived from the liquid crystal compound of the cholesteric liquid crystal layer is inclined with respect to a straight line orthogonal to at least one main surface out of two main surfaces positioned on the opposite sides of the cholesteric liquid crystal layer, in the cross-sectional view of the cholesteric liquid crystal layer in the thickness direction, the cholesteric liquid crystal layer has a stripe pattern in which a bright portion and a dark portion are alternatively arranged, and in the cross-sectional view of the cholesteric liquid crystal layer in the thickness direction, a periodic distribution of the bright portion and the dark portion is 0.05 μm or greater. The transparent screen according to the second embodiment of the present disclosure is excellent in color reproducibility of an image by having the configuration.

The reason why the transparent screen according to the second embodiment of the present disclosure exhibits the effect is presumed as follows. By having the configuration, the transparent screen according to the second embodiment of the present disclosure can suppress the discreteness of the diffraction angle of light (in particular, visible light). That is, according to the transparent screen according to the second embodiment of the present disclosure, it is possible to suppress the wavelength dependence of the strength of the light (in particular, visible light) reaching the observer from the transparent screen from significantly changing depending on an observation position (in particular, the observation angle), and thus it is possible to provide the observer with an image that reproduces the original hue without being affected by the observation position. Therefore, the transparent screen according to the second embodiment of the present disclosure is excellent in color reproducibility of an image.

Hereinafter, the details of the transparent screen according to the second embodiment of the present disclosure will be described. However, in the following description, the matters described in the section of the "transparent screen according to the first embodiment" are taken into consideration in the transparent screen according to the second embodiment of the present disclosure, and the description of the matters that overlap with the matters described in the section of the "transparent screen according to the first embodiment" is omitted. The transparent screen according to the second embodiment of the present disclosure preferably has a part or all of the constituent elements of the transparent screen according to the first embodiment described above.

In the cross-sectional view of the cholesteric liquid crystal layer in the thickness direction, the periodic distribution of the bright portion and the dark portion is 0.05 µm or greater. According to the method for measuring the periodic distribution of the bright portion and the dark portion described later, the increase in the periodic distribution of the bright portion and the dark portion indicates an aspect that the stripe pattern in which the bright portion and the dark portion are alternately arranged is not uniform. Such properties cause diffraction and scattering of a wide range of wavelengths, and improve the color reproducibility of the image. From a viewpoint of color reproducibility of the image, the periodic distribution of the bright portion and the dark portion is more preferably 0.1 µm or greater, and more preferably 0.2 µm or greater. An upper limit of the periodic distribution of the bright portion and the dark portion is not limited. The periodic distribution of the bright portion and the dark portion may be 100 µm or less or 80 µm or less from a viewpoint of allowing the cholesteric liquid crystal layer to have a diffraction action.

The periodic distribution of the bright portion and the dark portion is measured by the following method.

(1) A cholesteric liquid crystal layer is cut in a thickness direction, and a cross-sectional image of the cholesteric liquid crystal layer is obtained using a scanning electron microscope or a polarizing microscope.

(2) A plurality of virtual lines which are parallel to at least one main surface out of two main surfaces positioned on opposite sides of the cholesteric liquid crystal layer and a thickness of the cholesteric liquid crystal layer by 1 µm are drawn on the cholesteric liquid crystal layer shown in the cross-sectional image. However, in a case where the thickness of the target cholesteric liquid crystal layer is 2 µm or less, in place of "a plurality of virtual lines dividing the thickness of the cholesteric liquid crystal layer by every 1 µm", two virtual lines dividing the thickness of the cholesteric liquid crystal layer into three equal parts are drawn. A length of each virtual line is 50 µm.

(3) Lengths of the virtual lines in an intersection region of the "adjacent bright portion and dark portion" and the "virtual line" observed in the cross-sectional image are measured, and the obtained values are used as period lengths of the bright portion and the dark portion. Measurement of the period lengths of the bright portion and the dark portion is performed along a 50 µm of virtual line, in other words, in a range of 50 µm. A value obtained by arithmetically averaging the measured values is defined as an average value AM1.

(4) An absolute value of the difference between a maximum value and a minimum value in the average value AM1 obtained by using each virtual line is obtained. The obtained value is used as the periodic distribution of the bright portion and the dark portion.

Examples of a method of adjusting the periodic distribution of the bright portion and the dark portion include a method of controlling an alignment regulating force imparted to a liquid crystal compound present in the vicinity of each of the two main surfaces positioned on the opposite sides of the cholesteric liquid crystal layer and a method of controlling an amount of a chiral agent. The alignment regulating force is controlled by an alignment control agent and an alignment layer, for example.

<Transparent Screen According to Third Embodiment>

The transparent screen according to a third embodiment of the present disclosure includes a first cholesteric liquid crystal layer containing a liquid crystal compound and a second cholesteric liquid crystal layer containing a liquid crystal compound, in a cross-sectional view of the first cholesteric liquid crystal layer in a thickness direction, a spiral axis derived from the liquid crystal compound of the first cholesteric liquid crystal layer is inclined with respect to a straight line orthogonal to at least one main surface out of two main surfaces positioned on the opposite sides of the first cholesteric liquid crystal layers, in the cross-sectional view of the first cholesteric liquid crystal layer in the thickness direction, the first cholesteric liquid crystal layer has a stripe pattern in which a bright portion and a dark portion are alternatively arranged, in a cross-sectional view of the second cholesteric liquid crystal layer in a thickness direction, a spiral axis derived from the liquid crystal compound of the second cholesteric liquid crystal layer is inclined with respect to a straight line orthogonal to at least one main surface out of two main surfaces positioned on the opposite sides of the second cholesteric liquid crystal layer, in the cross-sectional view of the second cholesteric liquid crystal layer in the thickness direction, the second cholesteric liquid crystal layer has a stripe pattern in which a bright portion and a dark portion are alternatively arranged, and in the cross-sectional view of the first cholesteric liquid crystal layer and the second cholesteric liquid crystal layer in the thickness direction, an absolute value of the difference between an average period length of the bright portion and the dark portion in the first cholesteric liquid crystal layer and an average period length between the bright portion and the dark portion in the second cholesteric liquid crystal layer is 0.05 µm or greater. The transparent screen according to the third embodiment of the present disclosure is excellent in color reproducibility of an image by having the configuration.

The reason why the transparent screen according to the third embodiment of the present disclosure exhibits the effect is presumed as follows. By having the configuration, the transparent screen according to the third embodiment of the present disclosure can suppress the discreteness of the diffraction angle of light (in particular, visible light). That is, according to the transparent screen according to the third embodiment of the present disclosure, it is possible to suppress the wavelength dependence of the strength of the light (in particular, visible light) reaching the observer from the transparent screen from significantly changing depending on an observation position (in particular, the observation angle), and thus it is possible to provide the observer with an image that reproduces the original hue without being affected by the observation position. Therefore, the transparent screen according to the third embodiment of the present disclosure is excellent in color reproducibility of an image.

Hereinafter, the details of the transparent screen according to the third embodiment of the present disclosure will be described. However, in the following description, the matters described in the section of the "transparent screen according to the first embodiment" are taken into consideration in the transparent screen according to the third embodiment of the present disclosure, and the description of the matters that overlap with the matters described in the section of the "transparent screen according to the first embodiment" is omitted. The transparent screen according to the third embodiment of the present disclosure preferably has a part or all of the constituent elements of the transparent screen according to the first embodiment described above.

The transparent screen according to the third embodiment of the present disclosure has a first cholesteric liquid crystal layer containing a liquid crystal compound and a second cholesteric liquid crystal layer containing a liquid crystal compound. The kind of the liquid crystal compound in the first cholesteric liquid crystal layer may be the same as or different from the kind of the liquid crystal compound in the second cholesteric liquid crystal layer. The second cholesteric liquid crystal layer may be laminated directly on the first cholesteric liquid crystal layer or via another layer. The transparent screen according to the third embodiment of the present disclosure may have a liquid crystal layer other than the first cholesteric liquid crystal layer and the second cholesteric liquid crystal layer.

In the cross-sectional view of the first cholesteric liquid crystal layer and the second cholesteric liquid crystal layer in the thickness direction, the absolute value of the difference between the average period length of the bright portion and the dark portion in the first cholesteric liquid crystal layer and the average period length of the bright portion and the dark portion in the second cholesteric liquid crystal layer is 0.05 μm or greater. Such properties cause diffraction and scattering of a wide range of wavelengths, and improve the color reproducibility of the image. From the viewpoint of color reproducibility of the image, the absolute value of the difference between the average period length of the bright portion and the dark portion in the first cholesteric liquid crystal layer and the average period length of the bright portion and the dark portion in the second cholesteric liquid crystal layer is preferably 0.1 μm or greater, and more preferably 0.2 μm or greater. An upper limit of the absolute value of the difference between the average period length of the bright portion and the dark portion in the first cholesteric liquid crystal layer and the average period length of the bright portion and the dark portion in the second cholesteric liquid crystal layer is not limited. The absolute value of the difference between the average period length of the bright portion and the dark portion in the first cholesteric liquid crystal layer and the average period length of the bright portion and the dark portion in the second cholesteric liquid crystal layer may be 100 μm or less, or 80 μm or less from the viewpoint of allowing the cholesteric liquid crystal layer to have a diffraction action.

The average period length of the bright portion and the dark portion is measured by the following method.

(1) A cholesteric liquid crystal layer is cut in a thickness direction, and a cross-sectional image of the cholesteric liquid crystal layer is obtained using a scanning electron microscope or a polarizing microscope.

(2) Lengths of a main surface of the cholesteric liquid crystal layer in an intersection region of the "adjacent bright portion and dark portion" and "at least one main surface out of the two main surfaces positioned on opposite sides of the cholesteric liquid crystal layer" observed in the cross-sectional image is measured, and the obtained value is used as a period length of the bright portion and the dark portion. Measurement of the period lengths of the bright portion and the dark portion is performed along the main surface of a 50 μm of cholesteric liquid crystal layer, in other words, in a range of 50 μm. A value obtained by arithmetically averaging the measured values is defined as an average period length of the bright portion and the dark portion.

Examples of a method for adjusting the absolute value of the difference between the average period length of the bright portion and the dark portion in the first cholesteric liquid crystal layer and the average period length of the bright portion and the dark portion in the second cholesteric liquid crystal layer include a method of controlling an alignment regulating force imparted to the liquid crystal compound contained in each cholesteric liquid crystal layer, for example. The alignment regulating force is controlled by an alignment control agent and an alignment layer, for example.

<Transparent Screen According to Fourth Embodiment>

The transparent screen according to a fourth embodiment of the present disclosure has at least one cholesteric liquid crystal layer containing a liquid crystal compound, in a cross-sectional view of the cholesteric liquid crystal layer in a thickness direction, a spiral axis derived from the liquid crystal compound of the cholesteric liquid crystal layer is inclined with respect to a straight line orthogonal to at least one main surface out of two main surfaces positioned on the opposite sides of the cholesteric liquid crystal layer, in the cross-sectional view of the cholesteric liquid crystal layer in the thickness direction, the cholesteric liquid crystal layer has a stripe pattern in which a bright portion and a dark portion are alternatively arranged, and in the cross-sectional view of the cholesteric liquid crystal layer in the thickness direction, an angle distribution of the bright portion is 3 degrees or greater. The transparent screen according to the fourth embodiment of the present disclosure is excellent in color reproducibility of an image by having the configuration.

The reason why the transparent screen according to the fourth embodiment of the present disclosure exhibits the effect is presumed as follows. By having the configuration, the transparent screen according to the fourth embodiment of the present disclosure can suppress the discreteness of the diffraction angle of light (in particular, visible light). That is, according to the transparent screen according to the fourth embodiment of the present disclosure, it is possible to suppress the wavelength dependence of the strength of the light (in particular, visible light) reaching the observer from the transparent screen from significantly changing depending on an observation position (in particular, the observation angle), and thus it is possible to provide the observer with an image that reproduces the original hue without being affected by the observation position. Therefore, the transparent screen according to the fourth embodiment of the present disclosure is excellent in color reproducibility of an image.

Hereinafter, the details of the transparent screen according to the fourth embodiment of the present disclosure will be described. However, in the following description, the matters described in the section of the "transparent screen according to the first embodiment" are taken into consideration in the transparent screen according to the fourth embodiment of the present disclosure, and the description of the matters that overlap with the matters described in the section of the "transparent screen according to the first embodiment" is omitted. The transparent screen according to the fourth embodiment of the present disclosure preferably has a part or all of the constituent elements of the transparent screen according to the first embodiment described above.

In the cross-sectional view of the cholesteric liquid crystal layer in the thickness direction, the angle distribution of the bright portion is 3 degrees or greater. According to the method for measuring the angle distribution of the bright portion, which will be described later, the increase in the angle distribution of the bright portion indicates that the stripe pattern in which the bright portion and the dark portion are alternately arranged is not uniform. Such properties cause diffraction and scattering of a wide range of wavelengths, and improve the color reproducibility of the image. From a viewpoint of color reproducibility of the image, the angle distribution of the bright portion is preferably 7 degrees or greater, and more preferably 10 degrees or greater. An upper limit of the angle distribution in the bright portion is not limited. The angle distribution of the bright portion may be 180 degrees or less or 175 degrees or less.

The angle distribution of the bright portion is measured by the following method.

(1) A cholesteric liquid crystal layer is cut in a thickness direction, and a cross-sectional image of the cholesteric liquid crystal layer is obtained using a scanning electron microscope or a polarizing microscope.

(2) A plurality of virtual lines which are parallel to one main surface out of two main surfaces positioned on the opposite sides of the cholesteric liquid crystal layer and a thickness of the cholesteric liquid crystal layer by 1 µm are drawn on the cholesteric liquid crystal layer shown in the cross-sectional image. However, in a case where the thickness of the target cholesteric liquid crystal layer is 2 µm or less, in place of "a plurality of virtual lines dividing the thickness of the cholesteric liquid crystal layer by every 1 µm", two virtual lines dividing the thickness of the cholesteric liquid crystal layer into three equal parts are drawn. A length of each virtual line is 50 µm.

(3) The angle formed between the bright portion and the virtual line observed in each region of the cholesteric liquid crystal layer divided by the virtual line is measured. The measurement of the angle formed between the bright portion and the virtual line is performed along the virtual line of 50 µm, in other words, in the range of 50 µm. The value obtained by arithmetically averaging the measured values is defined as an average value AM2.

(4) An absolute value of the difference between a maximum value and a minimum value in the average value AM2 obtained by using each virtual line is obtained. The obtained value is used as the angle distribution of the bright portion.

Examples of a method of adjusting the angle distribution of the bright portion include a method of controlling an alignment regulating force imparted to the liquid crystal compound present in the vicinity of each of the two main surfaces positioned on the opposite sides of the cholesteric liquid crystal layer. The alignment regulating force is controlled by an alignment control agent and an alignment layer, for example.

<Transparent Screen According to Fifth Embodiment>

The transparent screen according to a fifth embodiment of the present disclosure includes a first cholesteric liquid crystal layer containing a liquid crystal compound and a second cholesteric liquid crystal layer containing a liquid crystal compound, in a cross-sectional view of the first cholesteric liquid crystal layer in a thickness direction, a spiral axis derived from the liquid crystal compound of the first cholesteric liquid crystal layer is inclined with respect to a straight line orthogonal to at least one main surface out of two main surfaces positioned on the opposite sides of the first cholesteric liquid crystal layers, in the cross-sectional view of the first cholesteric liquid crystal layer in the thickness direction, the first cholesteric liquid crystal layer has a stripe pattern in which a bright portion and a dark portion are alternatively arranged, in a cross-sectional view of the second cholesteric liquid crystal layer in a thickness direction, a spiral axis derived from the liquid crystal compound of the second cholesteric liquid crystal layer is inclined with respect to a straight line orthogonal to at least one main surface out of two main surfaces positioned on the opposite sides of the second cholesteric liquid crystal layer, in the cross-sectional view of the second cholesteric liquid crystal layer in the thickness direction, the second cholesteric liquid crystal layer has a stripe pattern in which a bright portion and a dark portion are alternatively arranged, and in the cross-sectional view of the first cholesteric liquid crystal layer and the second cholesteric liquid crystal layer in the thickness direction, an absolute value of the difference between an average angle of the bright portion in the first cholesteric liquid crystal layer and an average angle of the bright portion in the second cholesteric liquid crystal layer is 3 degrees or greater. The transparent screen according to the fifth embodiment of the present disclosure is excellent in color reproducibility of an image by having the configuration.

The reason why the transparent screen according to the fifth embodiment of the present disclosure exhibits the effect is presumed as follows. By having the configuration, the transparent screen according to the fifth embodiment of the present disclosure can suppress the discreteness of the diffraction angle of light (in particular, visible light). That is, according to the transparent screen according to the fifth embodiment of the present disclosure, it is possible to suppress the wavelength dependence of the strength of the light (in particular, visible light) reaching the observer from the transparent screen from significantly changing depending on an observation position (in particular, the observation angle), and thus it is possible to provide the observer with an image that reproduces the original hue without being affected by the observation position. Therefore, the transparent screen according to the fifth embodiment of the present disclosure is excellent in color reproducibility of an image.

Hereinafter, the details of the transparent screen according to the fifth embodiment of the present disclosure will be described. However, in the following description, the matters described in the section of the "transparent screen according to the first embodiment" are taken into consideration in the transparent screen according to the fifth embodiment of the present disclosure, and the description of the matters that overlap with the matters described in the section of the "transparent screen according to the first embodiment" is omitted. The transparent screen according to the fifth embodiment of the present disclosure preferably has a part or all of the constituent elements of the transparent screen according to the first embodiment described above.

The transparent screen according to the fifth embodiment of the present disclosure has a first cholesteric liquid crystal layer containing a liquid crystal compound and a second cholesteric liquid crystal layer containing a liquid crystal compound. The kind of the liquid crystal compound in the first cholesteric liquid crystal layer may be the same as or different from the kind of the liquid crystal compound in the second cholesteric liquid crystal layer. The second cholesteric liquid crystal layer may be laminated directly on the first cholesteric liquid crystal layer or via another layer. The transparent screen according to the fifth embodiment of the present disclosure may have a liquid crystal layer other than the first cholesteric liquid crystal layer and the second cholesteric liquid crystal layer.

In the cross-sectional view of the first cholesteric liquid crystal layer and the second cholesteric liquid crystal layer in the thickness direction, the absolute value of the difference between the average angle of the bright portion in the first cholesteric liquid crystal layer and the average angle of the bright portion in the second cholesteric liquid crystal layer is 3 degrees or greater. Such properties cause diffraction and scattering of a wide range of wavelengths, and improve the color reproducibility of the image. From the viewpoint of color reproducibility of an image, the absolute value of the difference between the average angle of the bright portion in the first cholesteric liquid crystal layer and the average angle of the bright portion in the second cholesteric liquid crystal layer is preferably 7 degrees or greater, and more preferably 10 degrees or greater. An upper limit of the absolute value of the difference between the average angle of the bright portion in the first cholesteric liquid crystal layer and the average angle of the bright portion in the second cholesteric liquid crystal layer is not limited. The absolute value of the difference between the average angle of the bright portion in the first cholesteric liquid crystal layer and the average angle of the bright portion in the second cholesteric liquid crystal layer may be 180 degrees or less, or 175 degrees or less.

The average angle of the bright portion is measured by the following method.

(1) A cholesteric liquid crystal layer is cut in a thickness direction, and a cross-sectional image of the cholesteric liquid crystal layer is obtained using a scanning electron microscope or a polarizing microscope.

(2) The angle formed by the "bright portion" and "at least one main surface out of the two main surfaces positioned on opposite sides of the cholesteric liquid crystal layer" observed in the cross-sectional image is measured. The measurement of the angle formed between the "bright portion" and "at least one main surface out of the two main surfaces positioned on opposite sides of the cholesteric liquid crystal layer" is performed along a main surface of a 50 μm of cholesteric liquid crystal layer, in other words, in a range of 50 μm. A value obtained by arithmetically averaging the measured values is taken as an average angle of the bright portion.

Examples of a method of adjusting the absolute value of the difference between the average angle of the bright portion in the first cholesteric liquid crystal layer and the average angle of the bright portion in the second cholesteric liquid crystal layer include a method of controlling an alignment regulating force imparted to a liquid crystal compound contained in each cholesteric liquid crystal layer, for example. The alignment regulating force is controlled by an alignment control agent and an alignment layer, for example.

EXAMPLES

Hereinafter, the present disclosure will be described in detail with Examples. However, the present disclosure is not limited to the following examples.

Example 1

A screen of Example 1 was manufactured by the following procedure. The screen of Example 1 has a base material, an alignment layer, and a cholesteric liquid crystal layer in this order. A total light transmittance of the screen of Example 1 was 90% or greater.

[Preparation of Base Material]

As a base material, a long triacetyl cellulose (TAC) film (FUJIFILM Corporation, refractive index: 1.48, thickness: 80 μm, width: 300 mm) was prepared.

[Formation of Alignment Layer]

A composition for forming an alignment layer was prepared by stirring a mixture containing pure water (96 parts by mass) and PVA-205 (4 parts by mass, Kuraray Co., Ltd., polyvinyl alcohol) in a container kept warm at 80° C. was prepared. Using a bar (bar count: 6), the composition for forming an alignment layer was applied on a base material (triacetyl cellulose film), and then dried in an oven at 100° C. for 10 minutes. By the procedure described above, an alignment layer (thickness: 2 μm) was formed on the base material.

[Formation of Cholesteric Liquid Crystal Layer]

A cholesteric liquid crystal layer (thickness: 11 pin) was formed on an alignment layer by the following procedure.

(Preparation of Coating Liquid (1) for Forming a Liquid Crystal Layer)

After mixing each component shown below, the coating liquid (1) for forming a liquid crystal layer was prepared by filtering using a polypropylene filter (pore diameter: 0.2 μm).

—Component—

(1) Rod-like thermotropic liquid crystal compound (compound (A) below): 100 parts by mass (2) Chiral agent (compound (B) below, Palicolor (registered trademark) LC756, BASF SE): 1.2 parts by mass (3) Photopolymerization initiator (IRGACURE (registered trademark) 907, BASF Corporation): 3 parts by mass (4) Photopolymerization initiator (PM758, Nippon Kayaku Co., Ltd.): 1 part by mass (5) Alignment regulator (compound (C) below): 0.5 parts by mass (6) Solvent (methyl ethyl ketone): 184 parts by mass (7) Solvent (cyclohexanone): 31 parts by mass Compound (A) is a mixture of the following three compounds. The content of each compound in the mixture is 84% by mass, 14% by mass, and 2% by mass in order from the top.

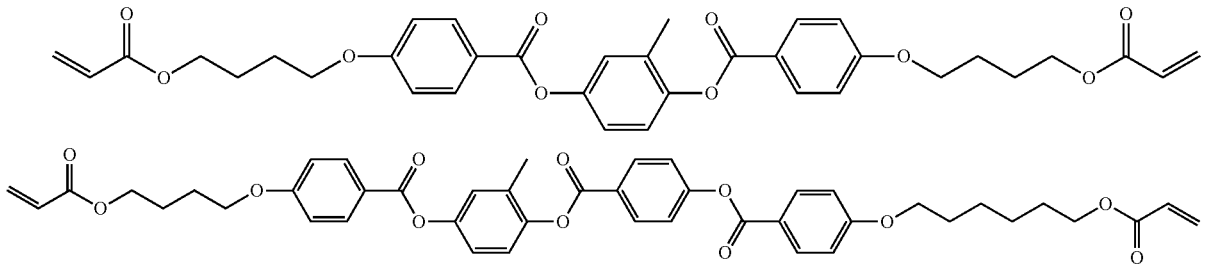

-continued

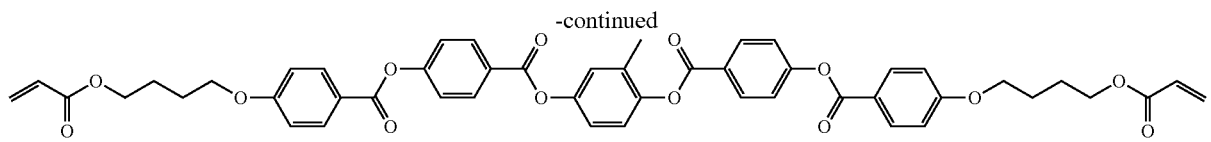

A chemical structure of compound (B) is shown below.

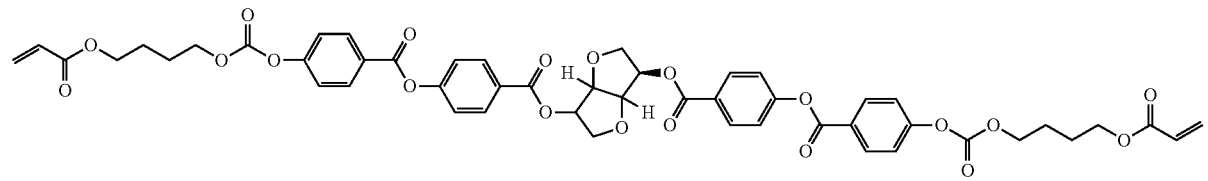 [SMILES: C=CC(=O)OCCCCOC(=O)Oc1ccc(C(=O)Oc2ccc(C(=O)OC3COC4C3OC[C@H]4OC(=O)c3ccc(OC(=O)c4ccc(OC(=O)OCCCCOC(=O)C=C)cc4)cc3)cc2)cc1]

A chemical structure of compound (C) is shown below.

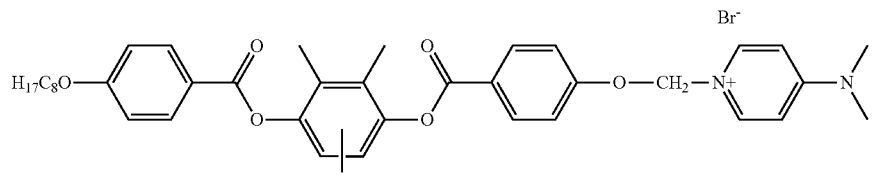

(Coating)

A base material having an alignment layer was heated at 70° C., and then a coating liquid for forming a liquid crystal layer (1) was applied on the alignment layer using a bar (bar count: 18).

(Drying)

The coating liquid for forming a liquid crystal layer (1) applied on the alignment layer was dried in an oven at 70° C. for 1 minute to form a coating film (thickness: 10 μm, content of solvent in the coating film: 1% by mass or less).

(Imparting of Shear Force)

A stainless steel blade heated at 70° C. was brought into contact with a coating film in a state in which the coating film was heated at 70° C., and then the blade was moved at a rate of 1.5 m/min while being still in contact with the coating film to impart a shear force to the coating film. A moving distance of the blade was 30 mm. A shear rate was 2,500 seconds$^{-1}$.

(Curing)

Ultraviolet rays (exposure amount: 500 mj/cm$^2$) was irradiated to the coating film to which a shear force was imparted using a metal halide lamp under a nitrogen atmosphere (oxygen concentration: <100 ppm) to cure the coating film.

Example 2

A screen of Example 2 was manufactured by the same procedure as in Example 1 except that an addition amount of the chiral agent was changed to 1.7 parts by mass. A total light transmittance of the screen of Example 2 was 90% or greater.

Example 3

A screen of Example 3 was manufactured by the same procedure as in Example 1, except that the coating liquid for forming a liquid crystal layer (1) was changed to a coating liquid for forming a liquid crystal layer (2) containing components shown below, after imparting a shear force, ultraviolet rays from a metal halide lamp were irradiated (exposure amount: 5 mJ/cm$^2$) to the coating film after shearing through a long-wavelength cut filter (Asahi Spectra Co., Ltd., SH0325), and then ultraviolet rays (exposure amount: 500 mJ/cm$^2$) were irradiated using a metal halide lamp under a nitrogen atmosphere (oxygen concentration: <100 ppm). A total light transmittance of the screen of Example 3 was 90% or greater.

—Component—
  (1) Rod-like thermotropic liquid crystal compound (compound (A)): 100 parts by mass
  (2) Chiral agent (compound (D) below): 1.5 parts by mass
  (3) Photopolymerization initiator (PM758, Nippon Kayaku Co., Ltd.): 1 part by mass
  (4) Alignment regulator (compound (C)): 0.5 parts by mass
  (5) Solvent (methyl ethyl ketone): 184 parts by mass
  (6) Solvent (cyclohexanone): 31 parts by mass The chemical structure of compound (D) is shown below.

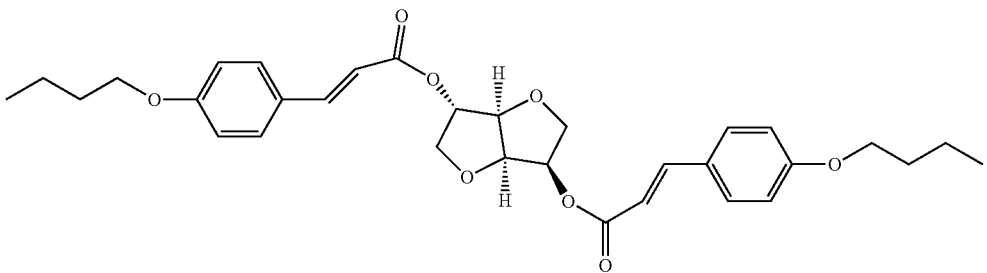 [SMILES: CCCCOc1ccc(/C=C/C(=O)O[C@H]2CO[C@H]3[C@@H]2OC[C@H]3OC(=O)/C=C/c2ccc(OCCCC)cc2)cc1]

Comparative Example 1

As the screen of Comparative Example 1, a transmission type diffraction grating 1000GP manufactured by Edmund Optics was prepared.

<Half Width of Peak Observed in Specific Strength Distribution>

A half width of a peak observed in a specific strength distribution of each screen was measured by the following method and measurement conditions. The measurement results are shown in Table 1.

[Method]

As a test piece, a screen having a width of 3 cm and a length of 3 cm was prepared. A light source was disposed on one main surface (meaning a surface on a side in which a base material is disposed in Examples 1 to 3. The same in the present paragraph) out of two main surfaces of the screen. A detector was disposed on the other main surface (meaning a surface on a side in which a cholesteric liquid crystal layer was disposed in Examples 1 to 3. The same in the present paragraph) out of two main surfaces of the screen. Light (wavelength: 532 nm) was irradiated to the one main surface out of the two main surfaces of the screen, and a strength of primary diffraction light emitted from the other main surface out of the two main surfaces was measured while changing an angle of the detector. The strength distribution of the primary diffraction light was created based on the measurement result. In the strength distribution of the primary diffraction light, the diffraction angle of the primary diffraction light was shown on a lateral axis, and the strength of the primary diffraction light was shown on a vertical axis. The half width (meaning a half value full width) of the peak observed in the strength distribution of the primary diffraction light was obtained.

[Measurement Condition]
(1) Light source: 532 nm laser, LPG350, Nihon Jisyaku Kogyo Co., Ltd.
(2) Detector: OPTICAL POWER SENSOR MA9411A, Anritsu Co., Ltd.
(3) Optical measuring instrument: OPTICAL POWER METER ML9001A, Anritsu Co., Ltd.
(4) Distance between screen and light source: 10 cm
(5) Distance between screen and detector: 10 cm
(6) Incident angle (angle formed between an incident direction of light and a straight line orthogonal to a main surface of a screen): 0 degree
(7) Measurement interval (detector angle interval): 1 degree <Color Reproducibility of Image>

The color reproducibility of an image of each screen was evaluated by the following methods and criteria. The evaluation results are shown in Table 1.

[Method]

As a test piece, a screen having a width of 10 cm and a length of 10 cm was prepared. The screen was disposed along the direction of gravitational force. Light of a white fluorescent lamp (FLR40S-W-NU/M, Panasonic Corporation) installed above a rear surface of the screen (meaning a surface on a side in which a base material was disposed in Examples 1 to 3. The same hereinafter) was incident on the rear surface of the screen, and then a front surface (meaning a surface on a side in which a cholesteric liquid crystal layer was disposed in Examples 1 to 3. The same hereinafter) of the screen was visually observed. An angle formed between the incident direction of the light of the white fluorescent lamp and the rear surface of the screen was set to 60 degrees. The front surface of the screen was observed while changing the observation angle in a horizontal direction (that is, the angle formed by the observation direction and the straight line orthogonal to the front surface of the screen) within a range of ±10 degrees.

[Criteria]
A: The hue that is visually recognized on the front surface of the screen does not change depending on the observation angle.
B: The hue that is visually recognized on the front surface of the screen changes depending on the observation angle.

TABLE 1

| | Half width of peak [degree] | Average length of one period of spiral axis [μm] | Average angle of spiral axis [degree] | Periodic distribution of bright portion and dark portion [μm] | Angle distribution of bright portion [degree] | Evaluation Color reproducibility of image |
|---|---|---|---|---|---|---|
| Example 1 | 8.0 | 1.7 | 42 | 0.5 | 25 | A |
| Example 2 | 8.6 | 1.2 | 43 | 0.4 | 20 | A |
| Example 3 | 6.3 | 1.7 | 89 | 0.1 | 10 | A |
| Comparative Example 1 | 1.3 | — | — | — | — | B |

From the evaluation results shown in Table 1, it was found that the color reproducibility of the images in Examples 1 to 3 was excellent compared to Comparative Example 1. In Examples 1 to 3, the half width of the peak, the periodic distribution of the bright portion and the dark portion, and the angle distribution of the brightness observed in the specific strength distribution are large, and diffraction and scattering of a wide range of wavelength are caused, and thus it is presumed that the color reproducibility of an image is excellent.

In Table 1, "the average length of one period of the spiral axis" represents an average length of one period of the spiral axis in the cross-sectional view of the cholesteric liquid crystal layer in the thickness direction. Numerical values described in the column of "the average length of one period of the spiral axis" were measured by the method described above.

In Table 1, the "the average angle of the spiral axis" represents an average angle of the spiral axis derived from the liquid crystal compound of the cholesteric liquid crystal layer to the straight line orthogonal to at least one main surface out of the two main surfaces positioned on the opposite sides of the cholesteric liquid crystal layer. The numerical values described in the column of "the average angle of the spiral axis" were measured by the method described above.

In Table 1, the "periodic distribution of the bright portion and the dark portion" represents the periodic distribution of the bright portion and the dark portion in the cross-sectional view of the cholesteric liquid crystal layer in the thickness direction. The numerical values described in the column of "the periodic distribution of the bright portion and the dark portion" were measured by the method described above.

In Table 1, the "angle distribution of the bright portion" represents an angle distribution of the bright portion in the cross-sectional view of the cholesteric liquid crystal layer in the thickness direction. The numerical values described in the column of "the angle distribution of the bright portion" were measured by the method described above.

As a result of observing the cross-section of each cholesteric liquid crystal layer in the thickness direction of Examples 1 to 3 using a polarizing microscope, the spiral axis derived from the liquid crystal compound of the cholesteric liquid crystal layer was inclined with respect to a straight line orthogonal to at least one main surface out of two main surfaces positioned on the opposite sides of the cholesteric liquid crystal layer. In addition, as a result of checking the surface of each cholesteric liquid crystal layer of Examples 1 to 3 using a polarizing microscope, a stripe pattern in which a bright portion and a dark portion are alternatively arranged along one direction of in-plane directions of the cholesteric liquid crystal layer was observed. That is, the liquid crystal compounds observed on the surface of the cholesteric liquid crystal layer were arranged while being twisted along one direction of the in-plane directions of the cholesteric liquid crystal layer.

The disclosure of Japanese Patent Application No. 2019-237298 filed Dec. 26, 2019 is incorporated herein by reference in its entirety. All documents, patent applications, and technical standards described in the present specification shall be incorporated by reference to the same extent as specifically and individually stated that individual documents, patent applications, and technical standards are incorporated by reference.

EXPLANATION OF REFERENCES $C_1$: Spiral axis
$D_1$: Arrangement axis
F: Base material
$L_1$: Molecular axis
X, Y, Z: Direction
10: Cholesteric liquid crystal layer
11, 12: Main surface
13: Rod-like liquid crystal compound
100: Coating device
200: Drying device
300: Blade
400: Light source
500, 510: Transport roll
600, 610: Backup roll

What is claimed is:

1. A transparent screen comprising:
two main surfaces, and
two or more cholesteric liquid crystal layers each containing a liquid crystal compound,
wherein out of light of which a wavelength incident on one main surface out of the two main surfaces is 532 nm, a half width of a peak observed in a distribution indicating strength with respect to a diffraction angle of a primary diffraction light emitted from the other main surface out of the two main surfaces is 2 degrees or greater,
wherein in at least one cross-sectional view of the cholesteric liquid crystal layers in a thickness direction, a spiral axis derived from the liquid crystal compound of the cholesteric liquid crystal layer is inclined with respect to a straight line orthogonal to at least one main surface out of two main surfaces positioned on opposite sides of the cholesteric liquid crystal layer, and
wherein directions of the spiral axes derived from the liquid crystal compounds of at least two cholesteric liquid crystal layers are different from each other.

2. The transparent screen according to claim 1,
wherein the liquid crystal compound observed on at least one main surface out of the two main surfaces positioned on the opposite sides of the cholesteric liquid crystal layer is arranged while being twisted along one direction of an in-plane direction of the cholesteric liquid crystal layer.

3. The transparent screen according to claim 1,
wherein in the at least one cross-sectional view of the cholesteric liquid crystal layer in the thickness direction, an average angle of the spiral axis is 20 degrees to 90 degrees with respect to the straight line orthogonal to the at least one main surface out of the two main surfaces positioned on the opposite sides of the cholesteric liquid crystal layer.

4. The transparent screen according to claim 1,
wherein in the at least one cross-sectional view of the cholesteric liquid crystal layer in the thickness direction, an average length of one period of the spiral axis is 0.1 µm to 5 µm.

5. The transparent screen according to claim 1,
wherein the transparent screen is used as a rear projection screen.

6. The transparent screen according to claim 1,
wherein the transparent screen is used by being attached to an automobile window.

7. A transparent screen comprising:
a first cholesteric liquid crystal layer containing a liquid crystal compound; and
a second cholesteric liquid crystal layer containing a liquid crystal compound,
wherein in a cross-sectional view of the first cholesteric liquid crystal layer in a thickness direction, a spiral axis derived from the liquid crystal compound of the first cholesteric liquid crystal layer is inclined with respect to a straight line orthogonal to at least one main surface out of two main surfaces positioned on the opposite sides of the first cholesteric liquid crystal layer, in the cross-sectional view of the first cholesteric liquid crystal layer in the thickness direction, the first cholesteric liquid crystal layer has a stripe pattern in which a bright portion and a dark portion are alternatively arranged, in a cross-sectional view of the second cholesteric liquid crystal layer in a thickness direction, a spiral axis derived from the liquid crystal compound of the second cholesteric liquid crystal layer is inclined with respect to a straight line orthogonal to at least one main surface out of two main surfaces positioned on the opposite sides of the second cholesteric liquid crystal layer, in the cross-sectional view of the second cholesteric liquid crystal layer in the thickness direction, the second cholesteric liquid crystal layer has a stripe pattern in which a bright portion and a dark portion are alternatively arranged, and in the cross-sectional view of the first cholesteric liquid crystal layer and the second cholesteric liquid crystal layer in the thickness direction, an absolute value of a difference between an average period length of the bright portion and the dark portion in the first cholesteric liquid crystal layer and an average period length of the bright portion and the dark portion in the second cholesteric liquid crystal layer is 0.05 µm or greater.

8. The transparent screen according to claim 7, wherein the transparent screen is used as a rear projection screen.

9. The transparent screen according to claim 7, wherein the transparent screen is used by being attached to an automobile window.

10. A transparent screen comprising:
a first cholesteric liquid crystal layer containing a liquid crystal compound; and
a second cholesteric liquid crystal layer containing a liquid crystal compound, wherein in a cross-sectional view of the first cholesteric liquid crystal layer in a thickness direction, a spiral axis derived from the liquid crystal compound of the first cholesteric liquid crystal layer is inclined with respect to a straight line orthogonal to at least one main surface out of two main surfaces positioned on the opposite sides of the first cholesteric liquid crystal layer, in the cross-sectional view of the first cholesteric liquid crystal layer in the thickness direction, the first cholesteric liquid crystal layer has a stripe pattern in which a bright portion and a dark portion are alternatively arranged, in a cross-sectional view of the second cholesteric liquid crystal layer in a thickness direction, a spiral axis derived from the liquid crystal compound of the second cholesteric liquid crystal layer is inclined with respect to a straight line orthogonal to at least one main surface out of two main surfaces positioned on the opposite sides of the second cholesteric liquid crystal layer, in the cross-sectional view of the second cholesteric liquid crystal layer in the thickness direction, the second cholesteric liquid crystal layer has a stripe pattern in which a bright portion and a dark portion are alternatively arranged, and in the cross-sectional view of the first cholesteric liquid crystal layer and the second cholesteric liquid crystal layer in the thickness direction, an absolute value of a difference between an average angle of the bright portion in the first cholesteric liquid crystal layer and an average angle of the bright portion in the second cholesteric liquid crystal layer is 3 degrees or greater.

11. The transparent screen according to claim 10, wherein the transparent screen is used as a rear projection screen.

12. The transparent screen according to claim 10, wherein the transparent screen is used by being attached to an automobile window.

\* \* \* \* \*